US010135927B1

(12) United States Patent
Barber et al.

(10) Patent No.: US 10,135,927 B1
(45) Date of Patent: *Nov. 20, 2018

(54) ARINC 661 DISPLAY SYSTEM AND METHODS INCORPORATING NON-ARINC 661 PROTOCOLS

(71) Applicants: Sarah Barber, Cedar Rapids, IA (US); Patrick D. McCusker, Walker, IA (US); Alan E. Siniff, Marion, IA (US); Sethu R. Rathinam, Cedar Rapids, IA (US); Patrick J. Cosgrove, Cedar Rapids, IA (US)

(72) Inventors: Sarah Barber, Cedar Rapids, IA (US); Patrick D. McCusker, Walker, IA (US); Alan E. Siniff, Marion, IA (US); Sethu R. Rathinam, Cedar Rapids, IA (US); Patrick J. Cosgrove, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 337 days.

This patent is subject to a terminal disclaimer.

(21) Appl. No.: 14/499,193

(22) Filed: Sep. 28, 2014

(51) Int. Cl.
*H04L 29/08* (2006.01)
*G06F 3/0481* (2013.01)

(52) U.S. Cl.
CPC ............ *H04L 67/12* (2013.01); *G06F 3/0481* (2013.01); *H04L 67/10* (2013.01)

(58) Field of Classification Search
CPC ........ H04L 67/08; H04L 67/12–67/125; G06F 9/4443; G09G 2380/12; G09G 2360/18
See application file for complete search history.

(56) References Cited

U.S. PATENT DOCUMENTS 7,586,514 B1 * 9/2009 Salazar .................... F41G 3/02
348/144
8,725,318 B1 5/2014 McCusker
(Continued)

FOREIGN PATENT DOCUMENTS

EP 2866476 A * 4/2015 ............ H04W 4/008

OTHER PUBLICATIONS

ARINC Specification 661-4 "Cockpit Display System Interfaces to User Systems" published May 10, 2010. 466 pages.*
(Continued)

*Primary Examiner* — Abdullah Al Kawsar
*Assistant Examiner* — Patrick R Ramsey
(74) *Attorney, Agent, or Firm* — Daniel M. Barbieri; Donna P. Suchy; Angel N. Gerdzhikov

(57) ABSTRACT

System and methods for incorporating virtual network computing ("VNC") into a cockpit display system ("CDS") are disclosed. A system and method for incorporating VNC into the CDS is comprised of a non-aircraft remote system and a CDS, where the non-aircraft remote system is comprised of a VNC client and a remote display unit, and the CDS comprised of, in part, a VNC server and a PM configured with a method employing an aviation-industry standard protocol (e.g., ARINC 661) and a VNC protocol. A Second method for incorporating VNC into the CDS is comprised of a non-aircraft remote system and a CDS, where the non-aircraft remote system is comprised of a VNC server and a remote display unit, and the CDS comprised of, in part, a VNC client and a processing module ("PM") configured with a method employing an aviation-industry standard protocol and a VNC protocol.

9 Claims, 24 Drawing Sheets

(56) References Cited

U.S. PATENT DOCUMENTS

| | | | | |
|---|---|---|---|---|
| 9,003,085 | B2* | 4/2015 | Saugnac | G08G 5/0021 |
| | | | | 710/62 |
| 2007/0088467 | A1* | 4/2007 | H. Knotts | G01C 23/005 |
| | | | | 701/14 |
| 2009/0287787 | A1* | 11/2009 | Cabaret | G06F 13/387 |
| | | | | 709/206 |
| 2009/0319099 | A1* | 12/2009 | Corbefin | G06F 3/023 |
| | | | | 701/3 |
| 2013/0138728 | A1* | 5/2013 | Kim | G06F 15/16 |
| | | | | 709/203 |
| 2013/0243390 | A1* | 9/2013 | Yoshio | H04N 9/87 |
| | | | | 386/230 |
| 2013/0335320 | A1* | 12/2013 | Mori | G06F 13/00 |
| | | | | 345/156 |
| 2014/0013234 | A1* | 1/2014 | Beveridge | G06F 3/0484 |
| | | | | 715/740 |
| 2014/0120829 | A1* | 5/2014 | Bhamidipati | H04N 21/42207 |
| | | | | 455/3.06 |
| 2015/0126177 | A1* | 5/2015 | Bauer | H04L 67/125 |
| | | | | 455/420 |
| 2016/0097651 | A1* | 4/2016 | Jung | G01C 21/367 |
| | | | | 701/428 |

OTHER PUBLICATIONS

Wikipedia entry for "Virtual Network Computing", retrieved from Internet archive Wayback Machine capture of Jul. 2014, 3 pages.*

Wikipedia entry for "RFB protocol", retrieved from Internet archive Wayback Machine capture of Jul. 2014, 3 pages.*

StackOverflow.com discussion "What is the connection between RFB protocol and VNC protocol", retrieved from http://stackoverflow.com/questions/35731986/what-is-the-connection-between-rfb-protocol-and-vnc-protocol , last updated Nov. 2016, 2 pages.*

IEEE Authoritative Dictionary of Standards Terms, 7th Edition. Entry for "bitmap". 1 page.*

AT&T Labs Cambridge article on "Virtual Network Computing", retrieved from Internet archive Wayback Machine capture of Apr. 2014, 4 pages.*

"ODICIS (One Display for a Cockpit Interactive Solution)—Final public progress report", by Becouarn, L et al. ODICIS Consortium, 2012. 40 pages.*

AOPA Pilot; Sep. 2014; pp. 2, 6, back cover; Aircraft Owners and Pilots Association; U.S.A.

Federal Aviation Administration; Policy Regarding Datalink Communications Recording Requirements, Federal Register, Mar. 2, 2015, pp. 11108-11111, vol. 80—No. 40, U.S. Government Printing Office.

Mike Collier & Steve Smith; The Flight Dispatch Process; Cross Polar Working Group; Slide Presentation; Washington, D.C.; May 30, 2017-Jun. 1, 2017.

Federal Aviation Administration; Aircraft Dispatcher Practical Test Standards; May 2013; FAA-S-8081-10D; Flight Standards Service, Washington, D.C.

Federal Aviation Administration; Oceanic and International Operations; Airline Dispatcher Federation Annual Symposium; Slide Presentation; Oct. 11, 2012.

* cited by examiner

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 20 | 670 | 320 | 70 | 12 | 810 | 415 | 60 | 50 | 23 | 920 | 415 | 60 | 50 |
| 2 | 340 | 670 | 320 | 70 | 13 | 65 | 275 | 60 | 50 | 24 | 990 | 415 | 60 | 50 |
| 3 | 660 | 670 | 320 | 70 | 14 | 175 | 290 | 500 | 40 | 25 | 1060 | 415 | 60 | 50 |
| 4 | 980 | 670 | 320 | 70 | 15 | 665 | 275 | 60 | 50 | 26 | 1130 | 415 | 60 | 50 |
| 5 | 90 | 545 | 140 | 50 | 16 | 750 | 275 | 60 | 50 | 27 | 910 | 255 | 90 | 50 |
| 6 | 390 | 545 | 140 | 50 | 17 | 810 | 275 | 60 | 50 | 28 | 1010 | 255 | 90 | 50 |
| 7 | 690 | 545 | 140 | 50 | 18 | 65 | 135 | 60 | 50 | 29 | 1110 | 255 | 90 | 50 |
| 8 | 65 | 415 | 60 | 50 | 19 | 175 | 150 | 500 | 40 | 30 | 940 | 55 | 130 | 50 |
| 9 | 175 | 430 | 500 | 40 | 20 | 665 | 135 | 60 | 50 | 31 | 1080 | 55 | 130 | 50 |
| 10 | 665 | 415 | 60 | 50 | 21 | 750 | 135 | 60 | 50 | | | | | |
| 11 | 750 | 415 | 60 | 50 | 22 | 810 | 135 | 60 | 50 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 80 | 835 | 320 | 70 | 12 | 870 | 580 | 60 | 50 | 23 | 980 | 580 | 60 | 50 |
| 2 | 400 | 835 | 320 | 70 | 13 | 125 | 440 | 60 | 50 | 24 | 1050 | 580 | 60 | 50 |
| 3 | 720 | 835 | 320 | 70 | 14 | 235 | 455 | 500 | 40 | 25 | 1120 | 580 | 60 | 50 |
| 4 | 1040 | 835 | 320 | 70 | 15 | 725 | 440 | 60 | 50 | 26 | 1190 | 580 | 60 | 50 |
| 5 | 150 | 710 | 140 | 50 | 16 | 810 | 440 | 60 | 50 | 27 | 970 | 420 | 90 | 50 |
| 6 | 450 | 710 | 140 | 50 | 17 | 870 | 440 | 60 | 50 | 28 | 1070 | 420 | 90 | 50 |
| 7 | 750 | 710 | 140 | 50 | 18 | 125 | 300 | 60 | 50 | 29 | 1170 | 420 | 90 | 50 |
| 8 | 125 | 580 | 60 | 50 | 19 | 235 | 315 | 500 | 40 | 30 | 1000 | 220 | 130 | 50 |
| 9 | 235 | 595 | 500 | 40 | 20 | 725 | 300 | 60 | 50 | 31 | 1140 | 220 | 130 | 50 |
| 10 | 725 | 580 | 60 | 50 | 21 | 810 | 300 | 60 | 50 | | | | | |
| 11 | 810 | 580 | 60 | 50 | 22 | 870 | 300 | 60 | 50 | | | | | |

FIG. 5C

| BEFORE STARTING | (SQUAT2.SQUAT) RIFLE/GARFIELD COUNTY RGNL (RIL) |
|---|---|
| | SQUAT TWO DEPARTURE (RNAV) RIFLE, COLORADO |

▸ FUEL QUANTITY............................................3,000 LBS

| Video | Audio | Environment | System |

Lights
( Fuel Cabin )  ( Fwd )  ( Aft )

Ceiling Control  10%   (−)━━●━━━━(+) (On)(Off)

Valence Control  20%  (−)━━●━━━━(+) (On)(Off)

Lunule Control  40%  (−)━━━●━━━(+) (On)(Off)

Cabin Light Control
(On)(Off) (On)(Off)

Galley Lights Controls
(Galley) (Work) (Display)

(Brightness) (Close)

RNG TO RES  0 KTS  SPEC RNG GS  0 NM/LB   TAKE-OFF RUNWAY 26: Climb to 10500 direct OMJIY, and via
TIME TO RES  0:00  SPEC RNG TAS  0 NM/LB   234 track to YIRDU, and via 216 track to SQUAT.

FIG. 6A

| BEFORE STARTING | (SQUAT2.SQUAT) RIFLE/GARFIELD COUNTY RGNL (RIL) |
|---|---|
| | SQUAT TWO DEPARTURE (RNAV) RIFLE, COLORADO |

▸ FUEL QUANTITY............................................3,000 LBS
▸ FUEL SYSTEM.......................................................SET
▸ WEIGHT AND BALANCE..............................CHECKED
▸ PERFORMANCE DATA..................CHECKED AND SET
▸ LNAV AND VNAV........................................CHECKED
▸ HYD DEMAND PUMPS.....................AUTO (1-2), AUX
▸ ENGINE DISPLAY.....................................SELECTED
▸ BEACON LIGHTS................................................ON

FUEL MGMT

Note: Not to scale.

TAKE-OFF MINIMUMS
Rwy 8: NA-ATC.
Rwy 26: Standard with minimum climb of 397' per NM to 9700.

DEPARTURE ROUTE DESCRIPTION

TAKE-OFF RUNWAY 26: Climb to 10500 direct OMJIY, and via
234 track to YIRDU, and via 216 track to SQUAT.

| Pos | X(o) | Y(o) | X(size) | Y(size) | Pos | X(o) | Y(o) | X(size) | Y(size) | Pos | X(o) | Y(o) | X(size) | Y(size) |
|---|---|---|---|---|---|---|---|---|---|---|---|---|---|---|
| 1 | 40 | 418 | 160 | 35 | 12 | 435 | 293 | 30 | 25 | 23 | 490 | 291 | 30 | 25 |
| 2 | 200 | 418 | 160 | 35 | 13 | 63 | 221 | 30 | 25 | 24 | 525 | 291 | 30 | 25 |
| 3 | 360 | 418 | 160 | 35 | 14 | 118 | 228 | 250 | 20 | 25 | 560 | 291 | 30 | 25 |
| 4 | 520 | 418 | 160 | 35 | 15 | 363 | 221 | 30 | 25 | 26 | 595 | 291 | 30 | 25 |
| 5 | 75 | 356 | 70 | 25 | 16 | 405 | 221 | 30 | 25 | 27 | 485 | 211 | 45 | 25 |
| 6 | 225 | 356 | 70 | 25 | 17 | 435 | 221 | 30 | 25 | 28 | 535 | 211 | 45 | 25 |
| 7 | 375 | 356 | 70 | 25 | 18 | 63 | 151 | 30 | 25 | 29 | 585 | 211 | 45 | 25 |
| 8 | 63 | 208 | 30 | 25 | 19 | 118 | 158 | 250 | 20 | 30 | 500 | 111 | 65 | 25 |
| 9 | 118 | 291 | 250 | 20 | 20 | 363 | 151 | 30 | 25 | 31 | 570 | 111 | 65 | 25 |
| 10 | 363 | 293 | 30 | 25 | 21 | 405 | 151 | 30 | 25 | | | | | |
| 11 | 405 | 293 | 30 | 25 | 22 | 435 | 151 | 30 | 25 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 125 | 635 | 90 | 90 | 10 | 809 | 485 | 90 | 90 | 19 | 638 | 185 | 90 | 90 |
| 2 | 296 | 635 | 90 | 90 | 11 | 125 | 335 | 90 | 90 | 20 | 809 | 185 | 90 | 90 |
| 3 | 467 | 635 | 90 | 90 | 12 | 296 | 335 | 90 | 90 | 21 | 209 | 25 | 90 | 90 |
| 4 | 638 | 635 | 90 | 90 | 13 | 467 | 335 | 90 | 90 | 22 | 381 | 25 | 90 | 90 |
| 5 | 809 | 635 | 90 | 90 | 14 | 638 | 335 | 90 | 90 | 23 | 553 | 25 | 90 | 90 |
| 6 | 125 | 485 | 90 | 90 | 15 | 809 | 335 | 90 | 90 | 24 | 725 | 25 | 90 | 90 |
| 7 | 296 | 485 | 90 | 90 | 16 | 125 | 185 | 90 | 90 | 25 | 0 | 758 | 1024 | 20 |
| 8 | 467 | 485 | 90 | 90 | 17 | 296 | 185 | 90 | 90 | 26 | 0 | 140 | 1024 | 20 |
| 9 | 638 | 485 | 90 | 90 | 18 | 467 | 185 | 90 | 90 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 399 | 908 | 90 | 90 | 10 | 570 | 566 | 90 | 90 | 19 | 741 | 224 | 90 | 90 |
| 2 | 570 | 908 | 90 | 90 | 11 | 741 | 566 | 90 | 90 | 20 | 912 | 224 | 90 | 90 |
| 3 | 741 | 908 | 90 | 90 | 12 | 912 | 566 | 90 | 90 | 21 | 399 | 38 | 90 | 90 |
| 4 | 912 | 908 | 90 | 90 | 13 | 399 | 395 | 90 | 90 | 22 | 570 | 38 | 90 | 90 |
| 5 | 399 | 737 | 90 | 90 | 14 | 570 | 395 | 90 | 90 | 23 | 741 | 38 | 90 | 90 |
| 6 | 570 | 737 | 90 | 90 | 15 | 741 | 395 | 90 | 90 | 24 | 912 | 38 | 90 | 90 |
| 7 | 741 | 737 | 90 | 90 | 16 | 912 | 395 | 90 | 90 | 25 | 0 | 1027 | 748 | 20 |
| 8 | 912 | 737 | 90 | 90 | 17 | 399 | 224 | 90 | 90 | 26 | 0 | 166 | 748 | 20 |
| 9 | 399 | 566 | 90 | 90 | 18 | 570 | 224 | 90 | 90 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 313 | 776 | 90 | 90 | 10 | 997 | 626 | 90 | 90 | 19 | 826 | 326 | 90 | 90 |
| 2 | 484 | 776 | 90 | 90 | 11 | 313 | 476 | 90 | 90 | 20 | 997 | 326 | 90 | 90 |
| 3 | 655 | 776 | 90 | 90 | 12 | 484 | 476 | 90 | 90 | 21 | 397 | 166 | 90 | 90 |
| 4 | 826 | 776 | 90 | 90 | 13 | 655 | 476 | 90 | 90 | 22 | 569 | 166 | 90 | 90 |
| 5 | 997 | 776 | 90 | 90 | 14 | 826 | 476 | 90 | 90 | 23 | 741 | 166 | 90 | 90 |
| 6 | 313 | 626 | 90 | 90 | 15 | 997 | 476 | 90 | 90 | 24 | 913 | 166 | 90 | 90 |
| 7 | 484 | 626 | 90 | 90 | 16 | 313 | 326 | 90 | 90 | 25 | 188 | 899 | 1024 | 20 |
| 8 | 655 | 626 | 90 | 90 | 17 | 484 | 326 | 90 | 90 | 26 | 188 | 281 | 1024 | 20 |
| 9 | 826 | 626 | 90 | 90 | 18 | 655 | 326 | 90 | 90 | | | | | | ns
ARINC 661 DISPLAY SYSTEM AND METHODS INCORPORATING NON-ARINC 661 PROTOCOLS

BACKGROUND OF THE INVENTION

Field of the Invention

This invention pertains generally to the field of aircraft display units that provide information to the pilot or flight crew of an aircraft.

Description of the Related Art

Hardware and software design standards for the aviation industry have been published by the Radio Technical Commission for Aeronautics ("RTCA"). The RTCA has published DO-254 entitled "Design Assurance Guidance for Airborne Electronic Hardware" and DO-178B entitled "Software Considerations in Airborne Systems and Equipment Certification." Each publication distinguishes between simple and complex electronic hardware, recognizes five classes of failure conditions, and provides guidance for each hardware and/or software design assurance level ("DAL") associated with a given failure condition.

Level A is considered the highest DAL and corresponds to a "catastrophic" failure condition of which failure of the hardware and/or software may cause a loss of the aircraft. Level B corresponds to a "hazardous" failure condition of which failure may cause a large negative impact on safety or performance, reduces the ability of the crew to operate the aircraft due to physical distress or a higher workload, or causes serious or fatal injuries among the passengers. Level C corresponds to a "major" failure condition of which failure may be significant but have a lesser impact than a hazardous failure or significantly increases crew workload. Level D corresponds to a "minor" failure condition of which failure may be noticeable but have a lesser impact than a major failure. Level E corresponds to a "no effect" failure condition of which failure has no impact on safety, aircraft operation, or crew workload.

To meet the higher DALs, many standards have been developed. With respect to presenting the pilot with flight-related information and aircraft-system information and/or allowing the pilot to control systems installed somewhere on the aircraft by interacting with a cockpit display unit, data exchange protocols have been published by Aeronautical Radio, Incorporated ("ARINC") in ARINC Specification 661 entitled "Cockpit Display System Interfaces to User Systems" ("ARINC 661"), an aviation industry standard known to those skilled in the art.

Although ARINC 661 could be employed for all aircraft systems, ARINC 661 may be considered too demanding for a manufacturer of an aircraft system because of the strict protocols stated therein. For example, information about real time parameter(s) of an aircraft system may be presented to the pilot and/or facilitate pilot control of the system; in order to do so, however, the strict protocols of the ARINC 661 have to be followed.

There may be occasions when an aircraft system does not need to meet higher DALs. For example, a cabin control system could be employed in an aircraft, but failure of such system may have no impact on safety, aircraft operation, and/or crew workload; instead, failure may mean a loss of passenger comfort. In this instance, although it may be beneficial to provide information about and/or control of the cabin control system to the pilot in the cockpit, it may not be beneficial and/or cost-effective for the manufacturer of the cabin control system to employ the strict protocols of ARINC 661 when such system does not have to meet higher DALs.

Virtual network computing ("VNC") may be employed with ARINC 661. For example, U.S. Pat. No. 8,725,318 of McCusker entitled "Systems and Methods for Incorporating Virtual Network Computing into a Cockpit Display System and Controlling a Remote Aircraft System with the VNC-Incorporated CDS" disclosed systems and methods for installing VNC into a cockpit display system ("CDS") and controlling remote aircraft systems with a VNC-incorporated CDS. Also, U.S. Pat. No. 9,060,010 of McCusker et al entitled "Systems and Methods for Incorporating Virtual Network Computing into a Cockpit Display System and Controlling a Non-Aircraft System with the VNC-Incorporated CDS" disclosed systems and methods for installing VNC into a CDS and controlling remote non-aircraft systems with a VNC-incorporated CDS, where a VNC client is installed in the CDS and a VNC server is installed in a remote non-aircraft system.

BRIEF SUMMARY OF THE INVENTION

The embodiments disclosed herein present novel and non-trivial system and methods for incorporating VNC into a CDS, where a VNC client may be installed in a remote non-aircraft system and a VNC server is installed in the CDS In one aspect, embodiments of the inventive concepts disclosed herein are directed to a system for incorporating VNC into a CDS. The system may include a non-aircraft system and a CDS. The non-aircraft remote system may include a VNC server and a remote display unit, and the CDS may include, in part, a VNC client and a processing module ("PM"). The PM could establish a pixel data set representative of a first image where the first image may include one or more non-VNC widgets based upon widget data provided by one or more user applications (singularly, "UA"). Then, the PM could receive from the VNS server input data representative of a request to display remote frame buffer ("RFB") data of a second image. In response, the PM could generate data representative of the request in a first protocol (e.g., ARINC 661 protocol) and sent to a UA. In response, a VNC client of the UA could generate data representative of a request for RFB data of the second image in a second protocol (e.g., VNC protocol) and send the RFB data to the VNC server of the non-aircraft system. In response, the VNC client could receive from the VNC server data representative of the RFB and send it to the VNC server of the UA. In response, VNC image widget data could be generated from the RFB data and sent to the PM by the UA. Then, the VNC image widget data could be incorporated into the pixel data set.

In a further aspect, embodiments of the inventive concepts disclosed herein are directed to a method for incorporating VNC into a CDS. When configured to carry out the method, the PM may perform the actions discussed in the preceding paragraph.

In a further aspect, embodiments of the inventive concepts disclosed herein are directed to a second system for incorporating VNC into a CDS. The second system may include a non-aircraft system and a CDS. The non-aircraft remote system may include a VNC client and a remote display unit, and the CDS may include, in part, a VNC server and a PM. The PM could establish a pixel data set representative of an image where the image could be comprised of one or more non-VNC widgets based upon widget data provided by one or more UAs. Then, the PM could receive input data representative of a request for RFB data of the image. Then, the PM could send the request for RFB data of the image to the VNC server. Then, the PM could receive RFB data and send it to the VNC client, where the image is presented on the remote display unit.

In a further aspect, embodiments of the inventive concepts disclosed herein are directed to a second method for incorporating VNC into a CDS. When configured to carry out the second method, the PM may perform the actions discussed in the preceding paragraph.

BRIEF DESCRIPTION OF THE DRAWINGS

FIG. 5C depicts a change to the local image corresponding to the change of FIG. 5B.

FIG. 6A depicts the exemplary remote image of FIG. 3A simultaneously with the exemplary local image of FIG. 2A when applied to the exemplary display surface format of FIG. 2D.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1A:
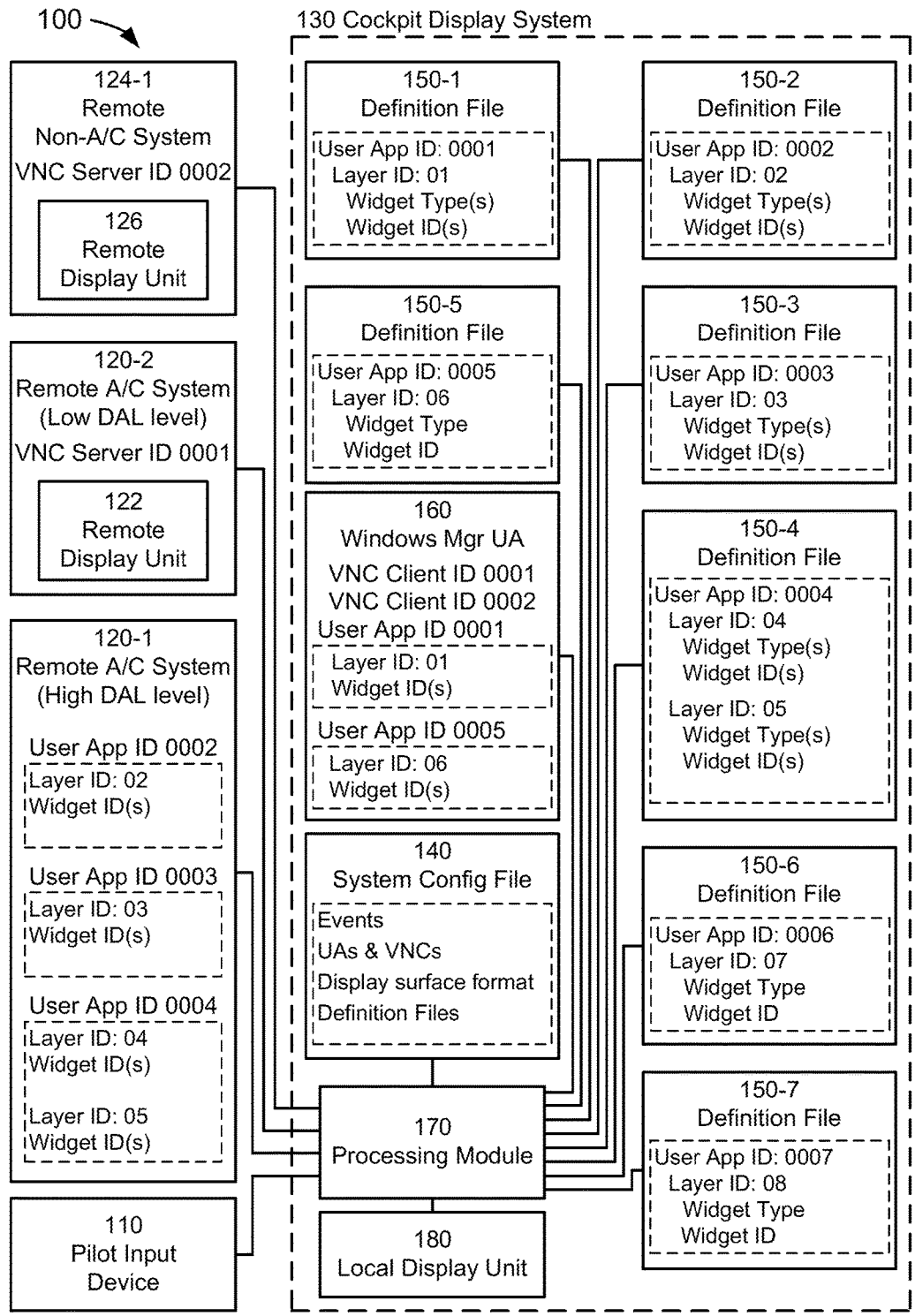
FIG. 1A depicts a first block diagram of a windows management and presentation system.
Figure 1B:
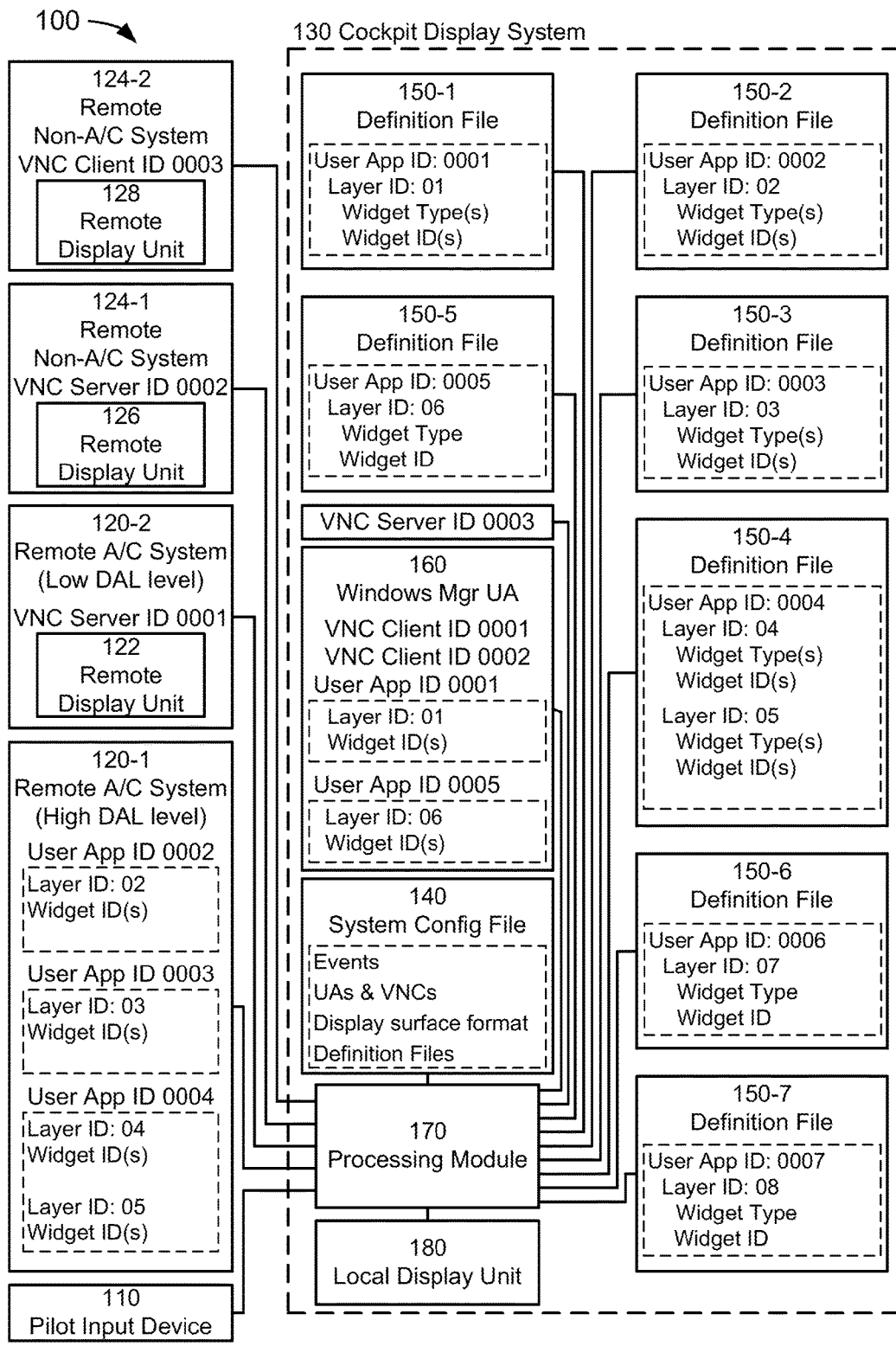
FIG. 1B depicts a second block diagram of a windows management and presentation system.

FIGS. 1A and 1B depict block diagrams of a windows management and presentation system (collectively, "presentation system") 100 suitable for implementation of the techniques described herein, wherein information generated by system employing hardware and/or software certified to a relatively low design assurance level ("DAL") may be presented on the same display surface of at least one display unit of a system employing hardware and/or software certified to a higher DAL. The presentation system 100 of the embodiments of FIGS. 1A and 1B includes a pilot input device 110, at least one remote aircraft system 120, at least one remote non-aircraft system 124, and a cockpit display system ("CDS") 130.

In the exemplary embodiments of FIGS. 1A and 1B, the pilot input device 110 may include any source for facilitating a pilot's interaction with graphical user interfaces ("GUI") referred to as interactive widgets that are displayed on the surface of a local display unit 180 (some non-interactive widgets could also be displayed). The pilot input device 110 may include any device that allows for the selection of a widgets and/or entry of data. Such devices could include, but are not limited to, a tactile device (e.g., keyboard, control display unit, cursor control device, touch screen device, etc. . . . ) and/or speech recognition systems. A local display unit 180 could be included as a pilot input device 110 if it is able to receive pilot input (e.g., touch screen display). As embodied herein, the pilot input device 110 may provide input representative of a pilot's selection to a processing module ("PM") 170. It should be noted that, although the discussion herein is drawn to the term "pilot," the definition of such term should not be limited to flight personnel but should include ground personnel and/or any viewer of the local display unit 180.

In the exemplary embodiments of FIGS. 1A and 1B, remote aircraft systems 120 could be comprised of any system installed in an aircraft in which a user application ("UA") and/or a virtual network computing ("VNC") server is installed; remote non-aircraft system 124-1 may be any system not installed in an aircraft but having a VNC server installed; remote non-aircraft system 124-2 may be any system not installed in an aircraft but having a VNC client installed. Types of remote aircraft systems 120 may include, but are not limited to, air conditioning, auto flight, communications, electrical power, cockpit/cabin systems, fire protection, flight controls, fuel, hydraulic power, ice and rain protection, instruments, landing gear, lights, navigation, oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems; types of a remote non-aircraft systems 124-1 and 124-2 may include, but are not limited to, system(s) employed by a flight operations management department and by an aircraft technical operations department (e.g., an aircraft maintenance department). As embodied herein, the contents of each UA, each VNC server 0001 and 0002, and/or VNC client 0003 may be read by the PM 170 when the CDS 130 is initialized.

As embodied herein, the UA of remote aircraft systems 120 and those items discussed below such as a system configuration file ("CF") 140, a plurality of definition files (DFs, or singularly "DF") 150, a windows manager UA ("WMUA") 160, and/or the PM 170 may be software components stored in a digital memory storage device or PM-readable media (i.e., media readable by the PM 170) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Although the system CF 140, the DFs 150, and the WMUA 160 are illustrated as being internal to the CDS 130, the storage devices storing any one of these may be external to the CDS 130 and used as an internal component of any other system of the aircraft.

Remote aircraft system 120-1 could be representative of one or more remote aircraft systems owning one or more UAs and layers therein, where each layer may be considered as the highest level entity known by each UA. Remote aircraft system 120-2 could be representative of one or more remote aircraft systems owning one or more VNC servers. Remote non-aircraft system(s) 124-1 could be representative of one or more remote non-aircraft systems owning one or more VNC servers, and remote non-aircraft system(s) 124-2 could be representative of one or more remote non-aircraft systems owning one or more VNC clients. Referring to FIGS. 1A and 1B, remote aircraft system 120-1 owns UA 0002 through UA 0004 and layers 02 through 05, remote aircraft system 120-2 owns a VNC server 0001, remote non-aircraft system 124-1 owns a VNC server 0002, and remote non-aircraft system 124-2 owns a VNC client 0003; the CDS 130 owns WMUA 160, layers 01 and 06, VNC client 0001, VNC client 0002, and VNC server 0003. For the purpose of discussion herein, remote aircraft system 120-1 will be assumed to require a relatively high DAL certification, remote aircraft system 120-2 will be assumed to require a lower DAL certification, and remote non-aircraft systems 124-1 and 124-2 will be assumed to require no DAL certification; DALs are discussed in detail below.

The UAs of remote aircraft system 120-1 may facilitate the dynamic exchange of blocks of data between the CDS 130 and remote aircraft systems 120-1, where exchange protocols have been published by Aeronautical Radio, Incorporated ("ARINC") in ARINC Specification 661 entitled "Cockpit Display System Interfaces to User Systems" ("ARINC 661"), an aviation industry standard known to those skilled in the art which is hereby and herein incorporated by reference in its entirety. In one direction of the dynamic exchange, UAs 0002 through 0004 of remote aircraft system 120-1 may send real-time parameters measured and/or calculated by remote aircraft system 120-1 to the CDS 130 as updated runtime parameters of one or more widgets of layers 0002 through 0004; also, UAs 0002 through 0004 may request changes to one or more layer properties of layers 0002 through 0004 such as, but not limited to, changes to layer visibility.

In the other direction of the dynamic exchange, the CDS 130 may send notices of real-time events (e.g., events initiated by interactions between a pilot input device 110 and widgets) to UAs 0002 through 0004 of remote aircraft system 120-1 as well as send notices of layer property changes such as, but not limited to, changes to layer activation. As embodied herein, remote aircraft system 120-1 may send widget parameters and layer property requests to the PM 170 and may receive widget events and layer properties from the PM 170.

Remote aircraft system 120-2 may include any system installed in an aircraft in which a VNC server is installed, remote aircraft non-system 124-1 may include any system not installed in an aircraft in which a VNC server is installed, and remote aircraft non-system 124-2 could be comprised of any system not installed in an aircraft in which a VNC client is installed; remote display units 122, 126, and 128 could be included in the remote aircraft system 120-2, remote non-aircraft system 124-1, and remote non-aircraft system 124-2, respectively. Each VNC server is part of a broader VNC system which, in addition to the VNC server, may be comprised of a VNC client and a VNC protocol employed in the exchange of data between the VNC server and the VNC client. The VNC server may be an application that, when employed, permits the remote images of the remote display units 122 and 126 to be viewed on another display unit, e.g., the local display unit 180, by sharing the contents of a frame buffer of the remote display unit 122 (the remote frame buffer ("RFB")) and/or the RFB of the remote display unit 126; likewise, the VNC server may be an application that, when employed, permits the image of the local display unit 180 to be considered as a remote image viewable on another display unit, e.g., remote display unit 128, by sharing the contents of a frame buffer of the local display unit 180 (the RFB of the local display unit 180).

The VNC client may be an application which allows the remote image to be viewed and/or controlled remotely. Personnel located in the cockpit of an aircraft may interact with a "VNC image widget" presented on the surface of the local display unit 180 to control a remote aircraft system 120-2 and/or a remote non-aircraft system 124-1 from the cockpit just as personnel interact with the remote image presented on the surface of the remote display unit 122 and/or the remote display unit 126. For the purpose of illustration and not limitation, the discussions herein of the remote aircraft system 120-2 and the remote non-aircraft system 124-1 will be drawn toward a cabin system and an iPad developed by Apple, Inc., respectively.

Referring to FIGS. 1A and 1B, the VNC protocol may be a protocol which facilitates the exchange of data between the CDS 130 and the remote aircraft system 120-2, the remote non-aircraft system 124-1, and/or the remote non-aircraft system 124-2; one non-exclusive example of a VNC protocol is an RFB protocol. The VNC client 0001, VNC client 0002, and/or VNC client 0003 may send client-to-server messages of real-time event occurrences to the VNC server 0001, VNC server 0002, and/or VNC server 0003, respectively, such as non-exclusive requests for updated RFB data and/or location and state data of a real-time event. In response, the VNC server 0001, VNC server 0002, and/or VNC server 0003 may send server-to-client messages to the VNS client 0001, VNC client 0002, and/or VNC client 0003 such as non-exclusive responses of updated RFB data. As embodied herein, the remote aircraft system 120-2 and/or remote non-aircraft system 124-1 may send server-to-client messages to the PM 170 and receive client-to-server messages from the PM 170; likewise, the remote non-aircraft system 124-2 may send client-to-server messages to the PM 170 and receive server-to-client messages from the PM 170.

In an embodiment of FIG. 1B, the CDS 130 may be comprised many components including the system CF 140, the plurality of DFs 150, the WMUA 160, the PM 170, the local display unit 180, and/or the VNC server 0003. The system CF 140 may be used to configure the initial settings for the CDS 130. The system CF 140 may include instructions for establishing a communication link(s) with one or more pilot input devices 110 for the subsequent receiving of input from a pilot's selection through widget interaction, where such input may trigger the PM 170 to recognize event associated with the pilot's selection. Also, the system CF 140 may include instructions or information related to the UAs of remote aircraft system 120-1, the VNC servers of remote aircraft system 120-2 and remote non-aircraft system 124-1, the VNC client of remote non-aircraft system 124-2, the UAs and the VNC clients stored in the WMUA 160, the VNC server 0003, the layers owned by both remote aircraft system 120-1 and the CDS 130, the configuration of a display surface format associated with the location of window(s) and the assignment of layer(s) to each window, and the loading and interpreting of the plurality of DFs 150. As embodied herein, the contents of the system CF 140 providing the initial settings for the CDS 130 may be loaded and interpreted by the PM 170 to begin an initialization process of the CDS 130.

In the exemplary embodiments of FIGS. 1A and 1B, DFs 150 could describe a hierarchical structure of widgets assigned to layers, where the widget could be considered as a building block. Because the types and/or identification of widgets between layers could vastly differ, no specific widget type and/or identification are shown in FIGS. 1A and 1B (including those shown in the remote aircraft system 120-1). Each widget could be defined by a set of parameters that control the graphical and/or interactive characteristics of that widget, where each parameter could be fixed or modified during runtime, i.e., a runtime parameter. Examples of widget parameters include, but are not limited to, visibility and enablement parameters. Also, each widget could have a graphical look that represents how the object will appear when it is drawn on the display surface of the local display unit 180. An interactive widget could be a GUI which provides a means for the pilot to interact with the CDS 130.

A widget could be grouped into one or more categories such as, but not limited to a container or logical widget (e.g., basic container, mutually exclusive container, radio box), a graphical representation widget (e.g., edit box text, graphical primitive ("GP") line, GP rectangle, label, push button, toggle button), a text string widget (edit box text, label, push button, toggle button), an interactive widget (e.g., edit box text, push button, toggle button), a map management widget (e.g., map grid, horizontal map, horizontal map source, horizontal map item list . . . . ), a dynamic motion widget (e.g., GP line, GP rectangle, label), a utility widget (e.g., connector, cursor reference), and a UA validation widget (e.g., basic container, edit box text, horizontal map, horizontal map source, mutually exclusive container, push button, radio box, toggle button).

As embodied herein, each VNC image widget may include an image created from the RFB data request and received by the VNC clients 0001 and/or 0002. For widget type, DF 150-5 could specify a memory size and/or location for storing RFB image data when received by the VNC clients 0001 and/or 0002 and forward to the WMUA 160. As discussed below, a manufacturer and/or end-user may configure the VNC image widget. The VNC image widget could be the same size as the remote image and/or a scaling factor could be applied. Also, part of the RFB data (e.g. parts of the top, bottom, and/or sides) could be truncated. The VNC image widget may also have widget parameters such as, visibility and enablement as stated in ARINC 661. The VNC image widget may not be interactive. That is, the VNC image widget may be an image only because the RFB data represents image data when the exchange between the VNC servers 0001 and/or 0002 and the VNC clients 0001 and/or 0002, respectively, takes place; however, when visible and enabled, the pilot may nevertheless treat the VNC image widget as being interactive when he or she selects the VNC image widget. As embodied herein, the location of the pilot's selection may be captured as surface (i.e., screen) coordinates by the VNC clients 0001 and/or 0002 and translated into corresponding remote image coordinates that are sent to the VNC servers 0001 and/or 0002, respectively.

Each DF 150 may include a single layer or a grouping of layers, where each layer may have a single widget or a grouping of widgets. Referring to FIGS. 1A and 1B, DFs 150-1, 150-2, 150-3, 150-5, 150-6, and 150-7 are comprised of single layers 01, 02, 03, 06, 07, and 08, respectively. DF 150-4 is comprised of a grouping of layers 04 and 05. Each DF 150 and each layer included therein could be owned by one UA. Referring to FIGS. 1A and 1B, DFs 150-1 and 150-5 through 150-7 are owned by WMUA 160, and DFs 150-2 through 150-4 are owned by UAs 0002 through 0004, respectively. As embodied herein, the contents of the DFs 150 may be read by the PM 170 when the CDS 130 is initialized.

In an embodiment of FIGS. 1A and 1B, the WMUA 160 is representative of one or more UAs and/or one or more VNC clients that could be owned by the CDS 130. Similar to the UAs of each remote aircraft system 120-1, the PM 170 may send notices of real-time event occurrences to the WMUA 160 and layer property changes such as layer activation to layer 01 and/or layer 06. Responding to such notices, the WMUA 160 may update the runtime parameters of one or more widgets owned by layer(s) and send them to the PM 170, as well as requests for changes to one or more layer properties such as the layer visibility and activity of layer 01 and/or layer 06. It should be noted that, although the VNC clients 0001 and 0002 are shown in FIG. 1A as being included but segregated in the WMUA 160, the VNC clients 0001 and/or 0002 may be treated separately from UAs 0001 and 0005 because the VNC clients 0001 and/or 0002 may employ VNC protocol whereas UAs 0001 and 0005 may employ ARINC 661 protocol. As embodied herein, the contents of the WMUA 160 may be read by the PM 170 when the CDS 130 is initialized.

In an embodiment of FIGS. 1A and 1B, the PM 170 may be any electronic data processing unit or combination of electronic data units which execute software or source code stored, permanently or temporarily, in a digital memory storage device as discussed above. The PM 170 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also include more than one electronic data processing units. As embodied herein, the PM 170 could be a processor(s) used by or in conjunction with any other system of the aircraft.

The PM 170 may be programmed or configured to receive data from the pilot input device 110; from the UAs 0002 through 0004 of remote aircraft system 120-1; from the VNC servers 0001 and/or 0002 of remote aircraft system 120-2, and remote non-aircraft system 124-1, respectively; from the VNC client 0003 of remote non-aircraft system 124-2; from the system CF 140; from the DFs 150; and/or from the WMUA 160. The PM 170 may be programmed to send data to the UAs 0002 through 0004 of remote aircraft system 120-1; to the VNC servers 0001 and/or 0002 of remote aircraft system 120-2 and remote non-aircraft system 124-1, respectively; to the VNC client 0003 of remote non-aircraft system 124-2; to the WMUA 160; and/or to the local display unit 180. The PM 170 may be programmed to execute the methods embodied herein and discussed in detail below.

As embodied herein, the terms "programmed" and "configured" are synonymous with respect to the execution of software or source code developed for the specific functions and methods embodied herein. The PM 170 may be electronically coupled to systems and/or sources to facilitate the receipt of data; as embodied herein, operatively coupled may be considered as interchangeable with electronically coupled. It is not necessary that a direct connection be made; instead, such receipt of input data and the providing of output data could be provided through a data bus or through a wireless network.

In the exemplary embodiments of FIGS. 1A and 1B, the local display unit 180 may be implemented as any unit having a display surface on which widgets may be presented to the pilot. The local display unit 180 could be, but is not limited to, a Primary Flight Director, Navigation Display, Head-Up Display, Head-Down Display, Multi-Purpose Control Display Unit, Engine Indicating and Crew Alerting System, Electronic Centralized Aircraft Monitor, Multi-Function Display, Side Displays, and Data Link Control Display Unit. As embodied herein, the local display unit 180 may receive image data sent by the PM 170.

The PM 170 may be programmed to own and manage one or more windows displayed on the surface of a display unit, where each window may be defined as a physical demarcation of space on the surface of the local display unit 180. Such physical demarcation information may have been provided in the system CF 140 and read by the PM 170. The visibility of each window could be managed by the PM 170, wherein the appearance of widgets in each window may be based upon both layer properties and widget parameters.

FIGS. 2A through 2D illustrate the local display unit 180 and three exemplary display surface formats that may be used to depict one local image on the surface of the local display unit 180, where the physical demarcation of space has created one or more windows including one or more layers. FIGS. 2A through 2D are provided for the purpose of illustration and not of limitation.

Figure 2A:
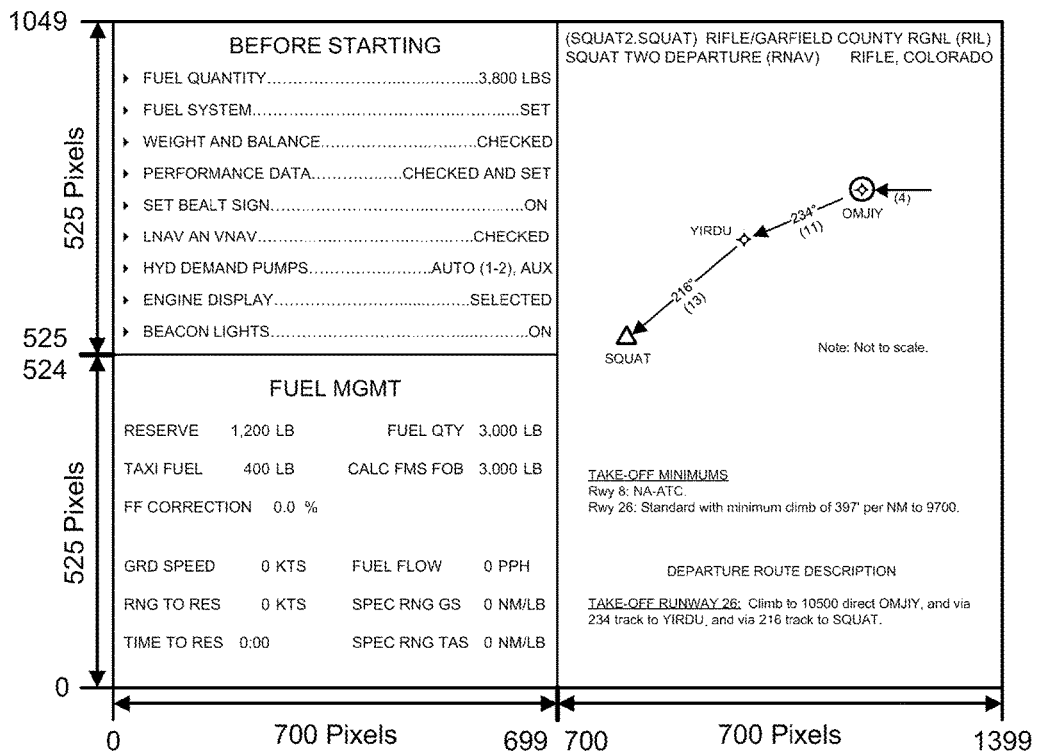
FIG. 2A depicts a local display unit and an exemplary local image presented thereon.

Referring to FIG. 2A, the local display unit 180 has a surface area of 1400 by 1050 pixels. On the surface of the display unit, a "BEFORE STARTING" checklist comprised of at least non-VNC widget is depicted on the upper left half, a "FUEL MGMT" panel comprised of at least non-VNC widget is depicted on the lower left half, and a departure procedure comprised of at least non-VNC widget and identified as "SQUAT TWO DEPARTURE" is depicted on the right half. It should be noted that, although the discussion herein will be drawn to the use of pixels as a unit of measurement, the use of another unit(s) such as millimeters may be used in place of pixels or along with pixels, where the latter may require the use of a conversion factor.

Figure 2B:
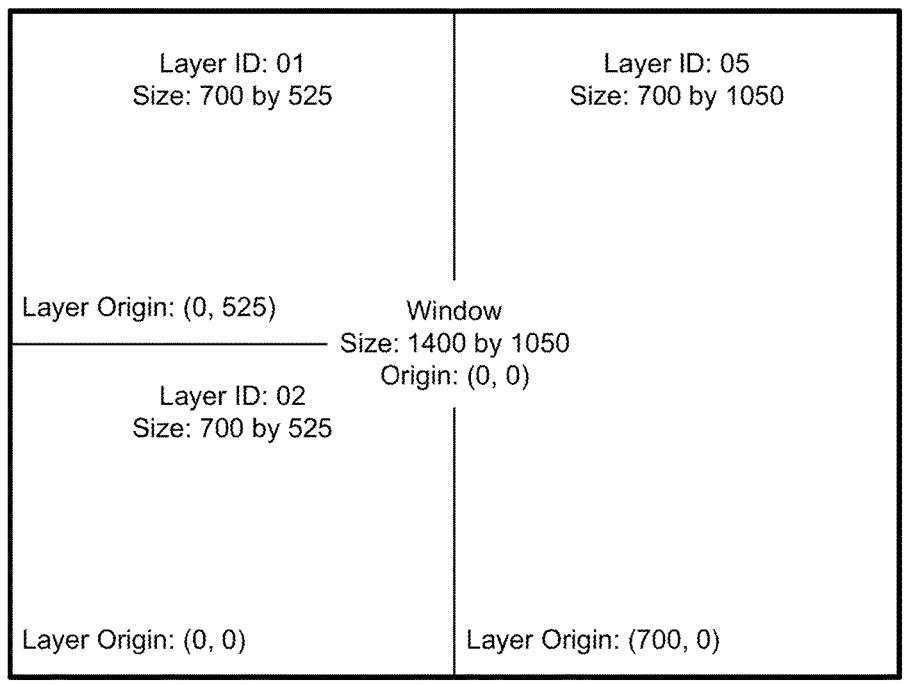
FIG. 2B illustrates a first exemplary display surface format for displaying a local image.

Referring to FIG. 2B, the exemplary display surface format shown is comprised of a single window (depicted with thick borders). In this example, it is assumed that the single window originates from surface pixel location (0, 0) and has the size of 1400 by 1050 pixels. The window has layers 01, 02, and 05 (depicted with thin borders). Layer 01 originates at window pixel location (0, 525) and has the size of 700 by 525 pixels, layer 02 originates from window pixel location (0, 0) and has the size of 700 by 525 pixels, and layer 05 originates from window pixel location (700, 0) and has the size of 700 by 1050 pixels; herein, window pixel locations are made in reference to the origin of the window. As shown in FIGS. 1A and 1B, layers 01, 02, and 05 are owned by UAs 0001, 0002, and 0004, respectively; UA 0001 is owned by the CDS 130; and UAs 0002 and 0004 are owned by remote aircraft system 120-1. For the purpose of discussion, the sizes of layers 01, 02, and 05 remain the same for the display surface formats of FIGS. 2C and 2D, and layers 03 and 04 and UA 0003 have been intentionally omitted (layer 06 is discussed below).

Figure 2C:
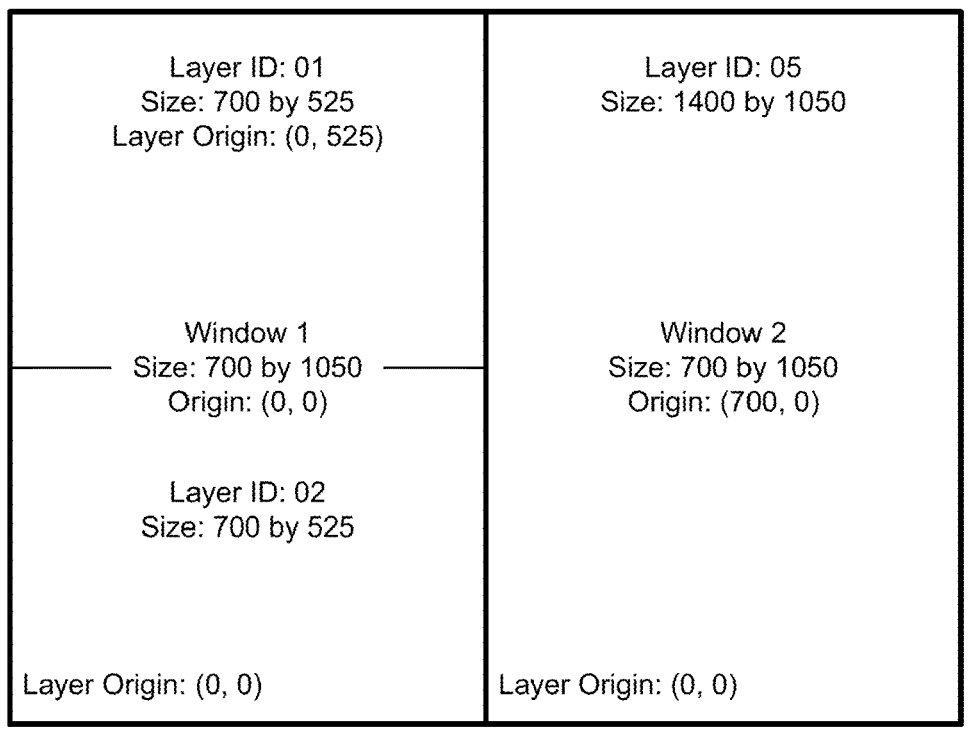
FIG. 2C illustrates a second exemplary display surface format for displaying a local image.

Referring to FIG. 2C, the exemplary display surface format shown is comprised of two windows. In this example, it is assumed that window 1 originates from surface pixel location (0, 0) and has the size of 700 by 1050 pixels, and window 2 originates from surface pixel location (700, 0) and has the size of 700 by 1050 pixels. Window 1 is comprised of layers 01 and 02, where layer 01 originates at pixel location (0, 525) of window 1, and layer 02 originates from pixel location (0, 0) of window 1. Window 2 is comprised of layer 05, where layer 05 originates at pixel location (0, 0) of window 2.

Figure 2D:
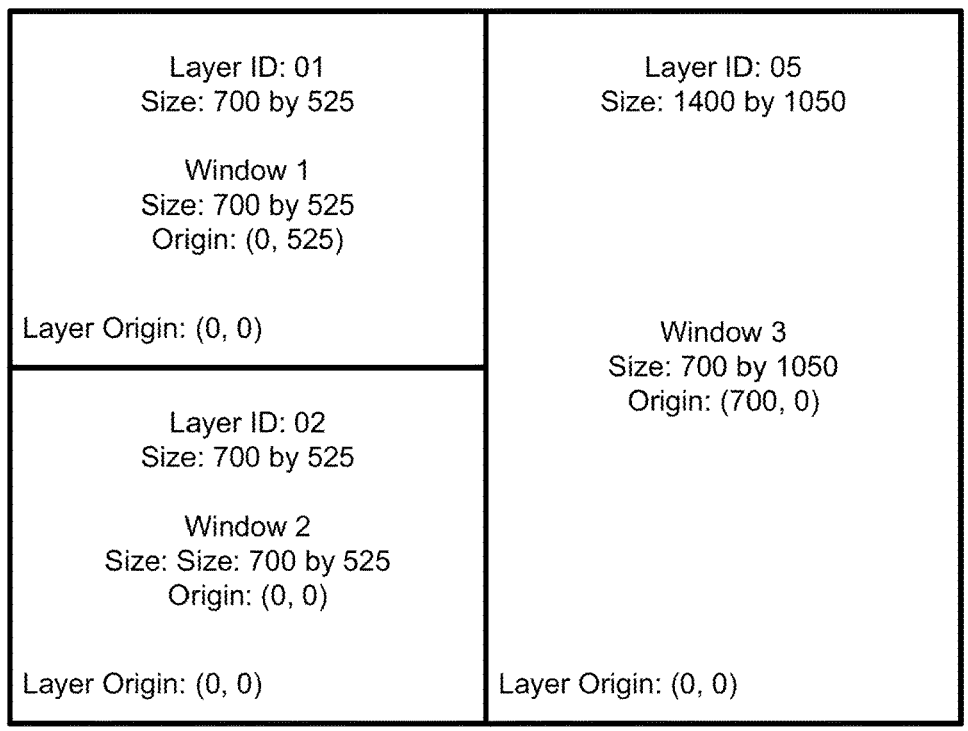
FIG. 2D illustrates a third exemplary display surface format for displaying a local image.

Referring to FIG. 2D, the exemplary display surface format shown is comprised of three windows. In this example, it is assumed that window 1 originates from surface pixel location (0, 525) and has the size of 700 by 525 pixels, window 2 originates from surface pixel location (0, 0) and has the size of 700 by 525 pixels, and window 3 originates from surface pixel location (700, 0) and has the size of 700 by 1050 pixels. Window 1 is comprised of layer 01, window 2 is comprised of layer 02, and window 3 is comprised of layer 05, where each layer originates at pixel location (0, 0) of its respective window.

To arrive at the local image shown in FIG. 2A, the PM 170 could have established a pixel data set representative of the image by employing ARINC 661 protocols. For instance, the layer activation property for layers 01, 02, and 05 has been set to the "on" position. After the PM 170 has sent notices of the activation to UA 0001 of the WMUA 160 and UAs 0002 and 0004 of remote aircraft system 120-1, the PM 170 has received requests from each of them to set the visibility property of these layers to the "on" position.

Figure 3A:
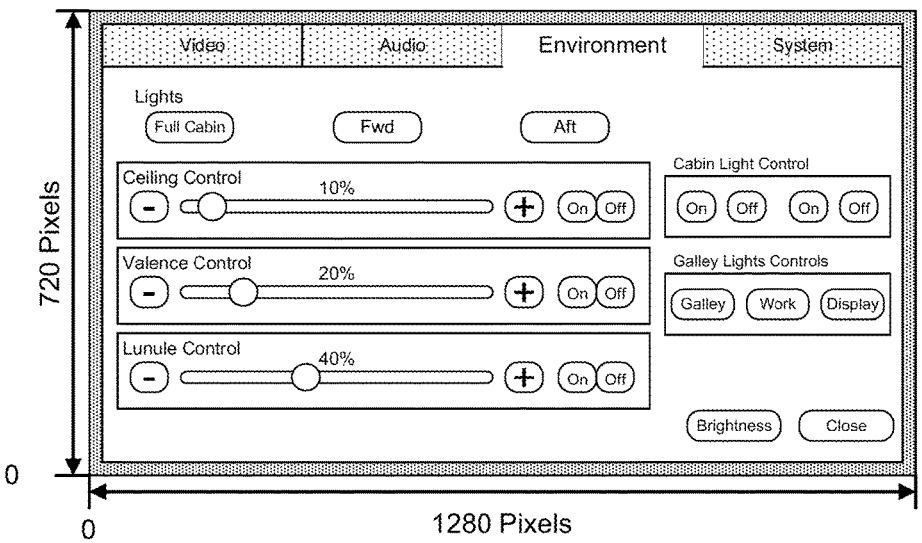
FIG. 3A depicts a remote display unit of a remote aircraft system and an exemplary remote image presented thereon.
Figure 3B:
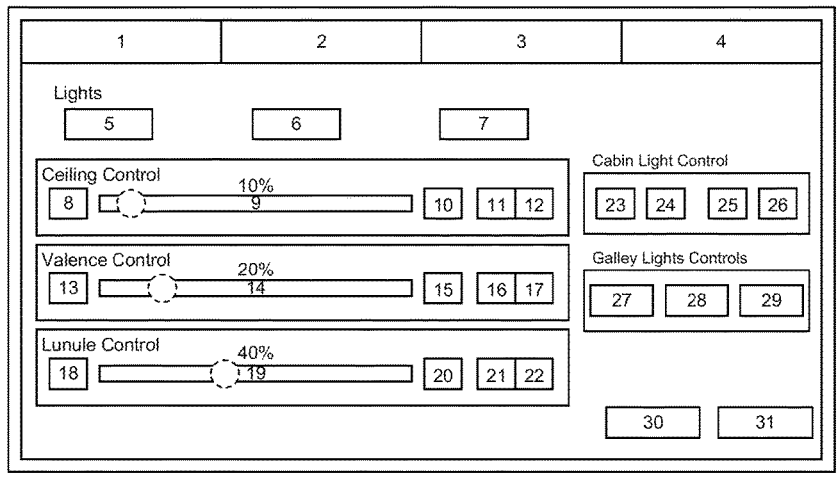
FIG. 3B illustrates an exemplary display surface format for displaying the exemplary remote image of FIG. 3A.

FIGS. 3A and 3B illustrate the remote image depicted on the surface of the remote display unit 122 and one exemplary display surface format that may be used to depict such remote image. For the purpose of illustration and not limitation, FIG. 3A illustrates the remote display unit 122 as a touch screen device having a surface area of 1280 by 720 pixels that depicts a plurality of interactive widgets including index tabs, pushbutton switches, and sliders. As shown in this illustration, the interactive widgets may facilitate the interaction between cabin personnel and a cabin control system used for providing comfort to passengers riding in the cabin during a flight. For the purpose of illustration, the cabin control system will be discussed, and although the following discussion of FIGS. 4 through 7 will be drawn to the image of FIG. 3A, the embodiments disclosed herein are not limited to merely a cabin control system.

Referring to FIG. 3B, the exemplary display surface format shown is comprised of a single window originating from surface pixel location (0, 0) occupying the entire display surface area of 1280 by 720 pixels. The window has a single layer originating at window pixel location (0, 0) and has the size of 1280 by 720 pixels. The layer is comprised of 31 interactive widgets corresponding to the index tabs (positions 1-4), push button switches (positions 5-8, 10-13, 15-18, and 20-31), and sliders (positions 9, 14, and 19). The location of the origin of each interactive widget is shown in the map table of FIG. 3B as X(ref) and Y(ref), where X(ref) and Y(ref) indicate the number of pixels measured from the origin of the layer to the origin of the widget; similarly, the size of each widget is shown in the map table as X(size) and Y(size), where X(size) and Y(size) are the number of pixels measured from the origin of the widget. As embodied herein, remote aircraft system 120-2 owns the window, layer, and widgets.

The advantages and benefits of the embodiments discussed herein may be illustrated by showing methods in which VNC techniques may be employed by two aircraft systems, where a non-ARINC 661 aircraft system (e.g., remote aircraft system 120-2) and/or a non-ARINC 661 non-aircraft system (e.g., remote non-aircraft system 124-1) including relatively simple hardware and/or software may be incorporated by an ARINC 661 aircraft system (e.g., the CDS 130) including complex hardware and/or software. Hardware and software design standards have been published by the Radio Technical Commission for Aeronautics ("RTCA"). The RTCA has published DO-254 entitled "Design Assurance Guidance for Airborne Electronic Hardware" and DO-178B entitled "Software Considerations in Airborne Systems and Equipment Certification." As discussed above, each publication distinguishes between simple and complex electronic hardware, recognizes five classes of failure conditions, and provides guidance for each hardware and/or software DAL associated with a given failure condition.

FIGS. 4A through 10H illustrate methods in which one protocol (e.g., the VNC protocol) may be adopted and employed simultaneously with another protocol (e.g. the ARINC 661 protocol) to incorporate information generated by a system certified to a low DAL (or no DAL) with information generated by a system certified to a high DAL.

Figure 4A:
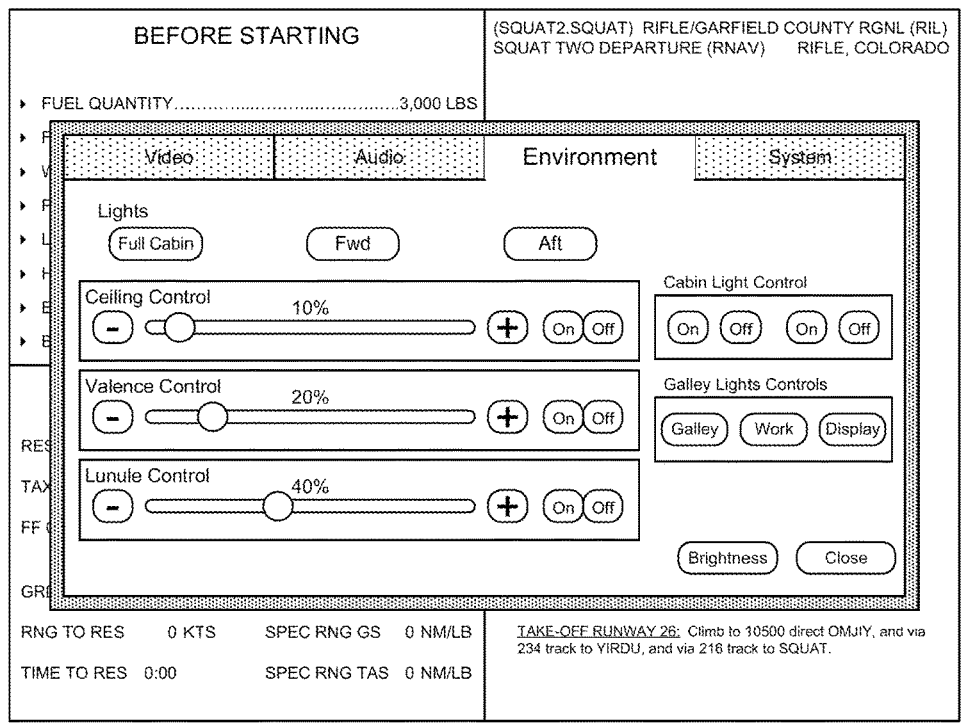
FIG. 4A depicts the exemplary remote image of FIG. 3A simultaneously with the exemplary local image of FIG. 2A when applied to the exemplary display surface format of FIG. 2B.

FIGS. 4A through 4D illustrate the local display unit 180 and the exemplary display surface format of FIG. 2B that may be used for the simultaneous depiction of images facilitated by the use of the ARINC 661 interface protocol between the CDS 130 and the remote aircraft system 120-1 simultaneously with the use of the VNC interface protocol between the CDS 130 and remote aircraft system 120-2. Referring to FIG. 4A, the remote image of FIG. 3A is shown simultaneously with the local image of FIG. 2A when applied to the display surface format of FIG. 2B; moreover, the remote image may or may not be depicted simultaneously on the remote display unit 122. In the examples presented in FIGS. 4A through 5C, personnel in the cockpit have access to and view the same image as personnel in the cabin.

To arrive at the local image shown in FIG. 4A, a pilot may have accessed a menu using the pilot input device 110, where the ability to display a menu upon a pilot's request is known to those skilled in the art. From the menu, the pilot could have made a request to enable him or her to make change(s) to the cabin settings via the cabin control system without leaving the cockpit. When the request is made, data representative of the pilot input could be received by the PM 170, where the input data may correspond to a request to display the remote image. In response, the PM 170 could activate layer 06 as well as generate and send data representative of a request to display the remote image to the WMUA 160. As embodied herein, the data could be sent using ARINC 661 protocol, and the request may include a notice to the WMUA 160 that layer 06 has been activated. In response, the WMUA 160 could forward data representative of the request to the VNC client 0001 which, in turn, could generate and send data representative of a client-to-server message in VNC protocol to the VNC server 0001 requesting RFB data.

In response, the VNC server 0001 could generate and send data representative of a server-to-client message in VNC protocol to the VNC client 0001 providing RFB data. In response, the VNC client 0001 could forward the RFB data to the WMUA 160. In response, the WMUA 160 could turn "on" at least a visibility parameter of the VNC image widget as well as generate and send VNC image widget data corresponding to the RFB data to the PM 170. As embodied herein, the VNC image widget data could be sent using ARINC 661 protocol and include in it a request to turn "on"

the visibility property of layer 06. In addition, the WMUA 160 could apply a scaling factor if a scaling factor of one is not applied and/or truncate the RFB data if the WMUA 160 is configured as such. In response, the PM 170 could incorporate the VNC image widget data into the existing pixel data set being used, such that a VNC image widget indicative of the remote image shown in FIG. 4A is represented in the incorporated pixel data set.

Figure 4B:
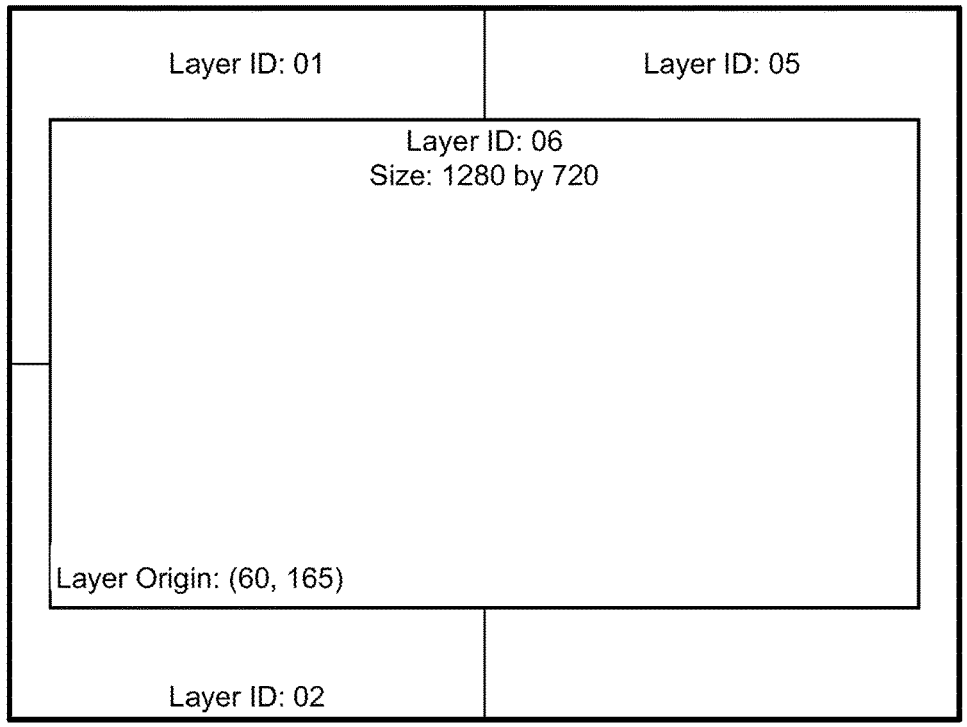
FIG. 4B depicts the exemplary display surface format of FIG. 2B with assigned layers.

Referring to FIG. 4B, the exemplary display surface format of FIG. 2B overlays layer 06 with layers 01, 02, and 05. Layer 06 originates at window pixel location (60, 165) which means it is centered on the window; the size of layer 06 is 1280 by 720 pixels, which means a scaling factor of one has been applied. Since the window for this display surface format has the same size as the surface of the local display unit 180 and the layer is centered on the window, layer 06 is also centered on the surface of the local display unit 180.

Figures 4C, 4D:
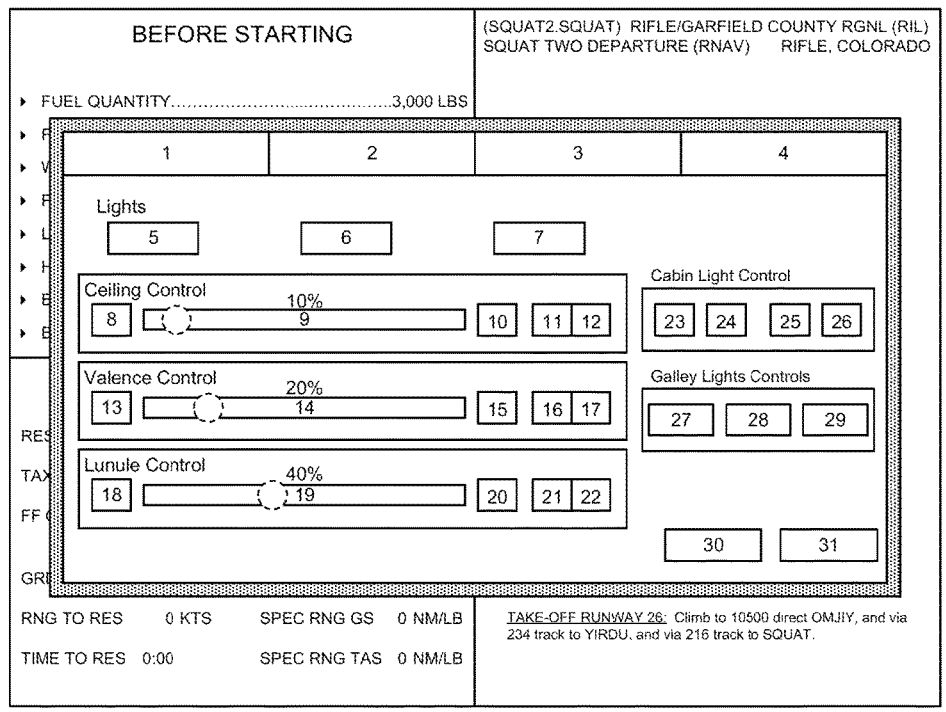
FIG. 4C depicts a map of the interactive widgets of the exemplary display surface format of FIG. 3B against the local image of FIG. 2A.
FIG. 4D depicts a map table corresponding to the map of the interactive widgets of FIG. 4C.

Referring to FIG. 4C, the map of the 31 interactive widgets shown in FIG. 3B is shown in place of its respective image shown of FIG. 4A. Because the image occupies the area of layer 06 and because layer 06 originates at window pixel location (60, 165), the origin of each of the widgets is different than listed in the map table of FIG. 3B. Referring to the map table of FIG. 4D, the locations of X(ref) and Y(ref) for each widget are increased by 60 and 165 pixels, respectively; however, the size of each widget indicated by its X(size) and Y(size) remains the same because the scaling factor of one has been applied.

It should be noted that the each of the 31 widgets have lost their interactive character as a result of the VNC protocol. The VNC server 0001 may send data representative of server-to-client message to the VNS client via the PM 170. The server-to-client message may be comprised of VNC RFB information. The data sent by the VNS server may inform the VNS client about the number of rectangles included in the data as well as the location and size of each rectangle data. Then, the location of each rectangle could be translated into location information corresponding to layer 06 and the size of each rectangle could be scaled into size information corresponding to layer 06. Then, image data representative of the translated location information and scaled size information could be generated and sent to the display unit, where the image represented in the image data could be presented in the area of layer 06.

Figure 5A:
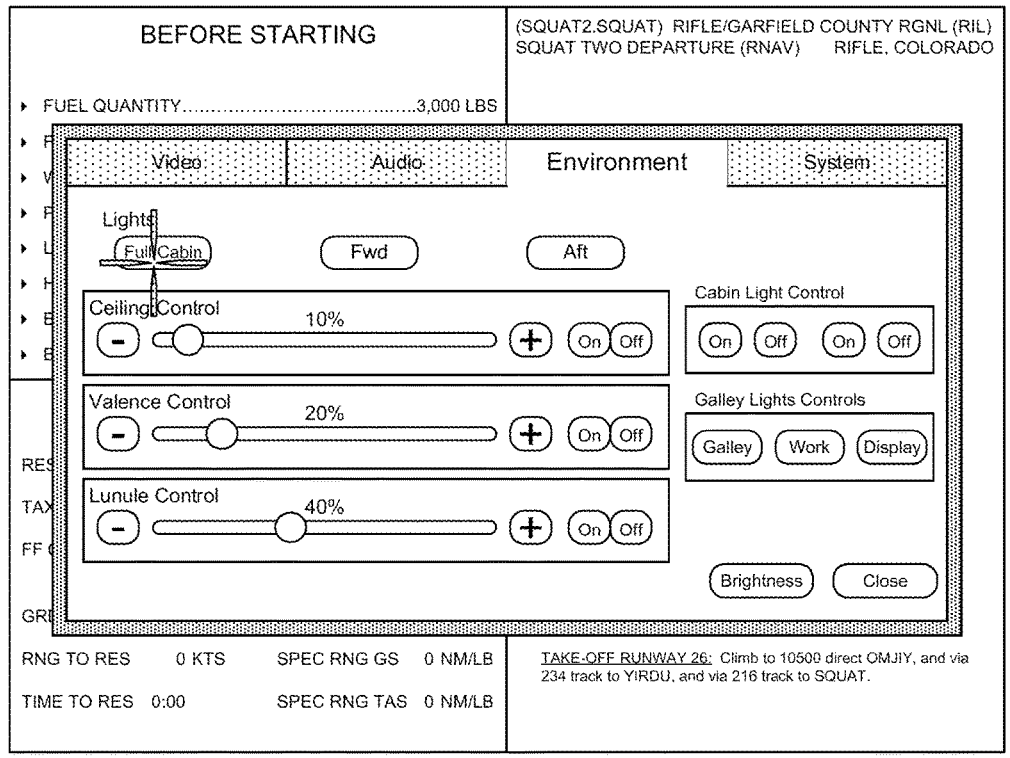
FIG. 5A depicts a selection made on a first local image shown on a local display unit.

In the examples discussed in FIGS. 5A through 7C, it will be assumed that personnel in the cockpit want to turn on the lights to the full cabin and move the lunule control to 80%. As shown in FIG. 5A, a cursor has been added to image of FIG. 4A, where the cursor is located over the "Full Cabin" push button of the VNC image widget. Moreover, the VNC image widget has been manually selected by the pilot pressing and releasing the cursor's button.

When the cursor's button is pressed, the PM 170 may be programmed to capture the surface coordinates of the cursor's location (206, 720) and convert them into layer coordinates (146, 555), where the X(layer)=206-60 and Y(layer)=720-165. Because an interaction with a VNC image widget has occurred, the PM 170 may notify the WMUA 160 of the event and provide the current state of the cursor's button (e.g., the cursor's button has been pressed) and the layer coordinates of the cursor's event in the notification. In response, the WMUA 160 could forward data representative of the notification to the VNC client 0001 which, in turn, could generate and send two client-to-server messages in VNC protocol to the VNC server 0001 of the remote aircraft system 120-2.

Figure 5B:
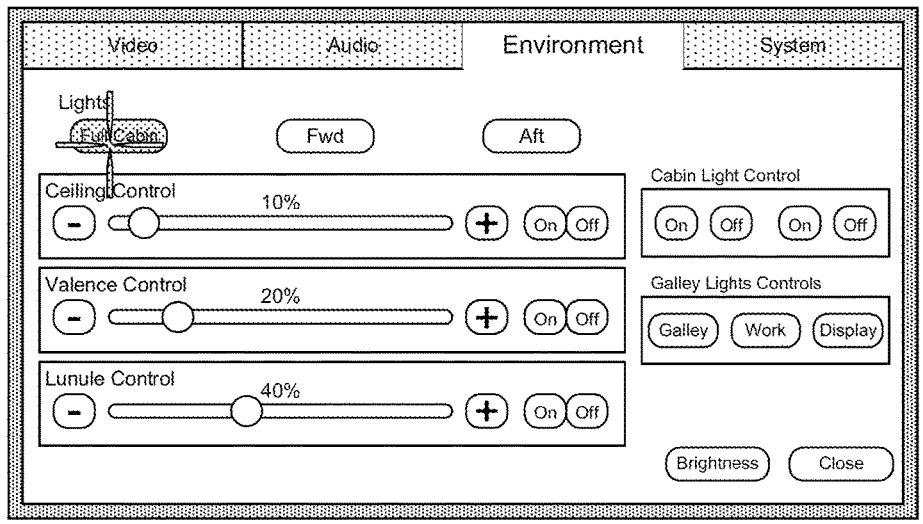
FIG. 5B depicts a change to the remote image corresponding to the selection of FIG. 5A.

In the first message, the VNC client 0001 may generate and send data representative of a client-to-server message to the VNC server 0001 notifying it of the current state of the cursor's button (i.e., pressed) and the event location of the cursor. As this message is received by the VNC server 0001, the remote aircraft system 120-2 may respond as if personnel had pressed the surface at given location (146, 555) of the remote display unit 122; that is, the remote aircraft system 120-2 may respond as if personnel had manually selected the "Full Cabin" interactive widget on the remote display unit 122. This response is indicated in FIG. 5B by the change of appearance of "Full Cabin" interactive widget (as well as the lights in the full cabin being turned on). If the remote image's cursor is present, it could have been located on top of the interactive widget.

In the second message, the VNC client 0001 may generate and send a client-to-server request comprised of data representative of a request for updated RFB information. In one embodiment, information about the entire RFB may be requested. In another embodiment, information about a limited area of the RFB may be requested when a map of the interactive widgets of the remote display has been made available to the PM 170 as a cross-reference. As shown in the map table of FIG. 3B, layer coordinates (146, 555) fall within the area of position 5 which corresponds to a "Full Cabin" pushbutton switch. After referring to the table, the request for a limited area of the RFB may correspond to X(ref)=90, Y(ref)=555, X(size)=140, and Y(size)=50. It should be noted that, until updated RFB information has been sent to the CDS 130, there will be no change in the appearance of the VNC image widget depicted on the local display unit 180 as shown in FIG. 5A.

In response to receiving the second message, the VNC server 0001 may generate and send data representative of a server-to-client message in VNC protocol to the VNC client 0001 providing it with the updated RFB data of either the entire RFB or the limited-area RFB. In response, the VNC client 0001 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 5C is represented in the newly-incorporated pixel data set.

In an embodiment in which the cursor's button is pressed but not released (such as in a manual input of "clicking and dragging"), the PM 170 may be programmed to capture the surface coordinates of the cursor's location and convert them into layer coordinates repeatedly while the button is pressed. For the purpose of illustration, it will be assumed that the position of the Lunule Control slider shown in FIG. 5A will be changed by personnel in the cockpit by "clicking and dragging" the round button of the slider until the slider is located at the 80% position. Because an interaction with a widget is occurring continuously, the PM 170 may repeatedly notify the WMUA 160 of the continuous VNC image widget event by providing the current (unchanged) state of the cursor's button and the (changing) layer coordinates of the cursor's location in each notification. In response to the repeated notifications, the WMUA 160 could forward data representative of the notification repeatedly to the VNC client 0001 which, in turn, could generate and send two client-to-server messages in VNC protocol repeatedly to the VNC server 0001 of the remote aircraft system 120-2.

In the repeated first messages, the VNC client 0001 may generate and send repeatedly data representative of clientto-server messages to the VNC server 0001 notifying it of the current (unchanging) state of the cursor's button and the current (changing) location of the cursor. As each of the repeated first messages are received by the VNC server, the remote aircraft system 120-2 may respond as if personnel had placed his or her finger on top of the round button of the interactive Lunule Control slider of the remote display unit 122 (assuming a touch screen in this example) and moved his or her finger to the right, "dragging" the slider to the right until his or her finger is lifted from the screen presumably as the position of the slider reaches the 80% position (and the lunule lights reach 80%).

In the repeated second messages, the VNC client 0001 may repeatedly generate and send data representative of client-to-server messages to the VNC server 0001 requesting it for updated RFB information of either the entire RFB or a limited-area RFB in the same fashion as discussed above. In response to receiving each repeated second message, the VNC server 0001 may generate and send data representative of a server-to-client message to the VNC client 0001 providing it with the updated RFB data of either the entire RFB or the limited-area RFB. In response, the VNC client 0001 could forward the updated RFB data to the WMUA 160 repeatedly. In response, the WMUA 160 could generate and send updated VNC image widget data corresponding to the RFB data to the PM 170 repeatedly. In response, the PM 170 could incorporate the updated VNC image widget data into the existing pixel data set repeatedly. As a result, a VNC image widget will be displayed on the surface of the local display unit 180 in which the Lunule Control slider will appear to move to the right until the cursor's button is released when the 80% position has been reached.

It should be noted that, although the remote aircraft system 120-2 responded to pressing of the cursor's button, a manufacturer and/or end-user could have configured the remote aircraft system 120-2 to respond when the cursor's button has been released and not when it's been pressed. In such configuration, the current state of the cursor's button in the first message generated by the WMUA 160 could have corresponded to the releasing of the cursor's button instead of the pressing of the cursor's button. Alternatively, an additional message corresponding to the releasing of the cursor's button could have been generated by the WMUA 160 in sequence after the first message but before the second message.

Figure 6B:
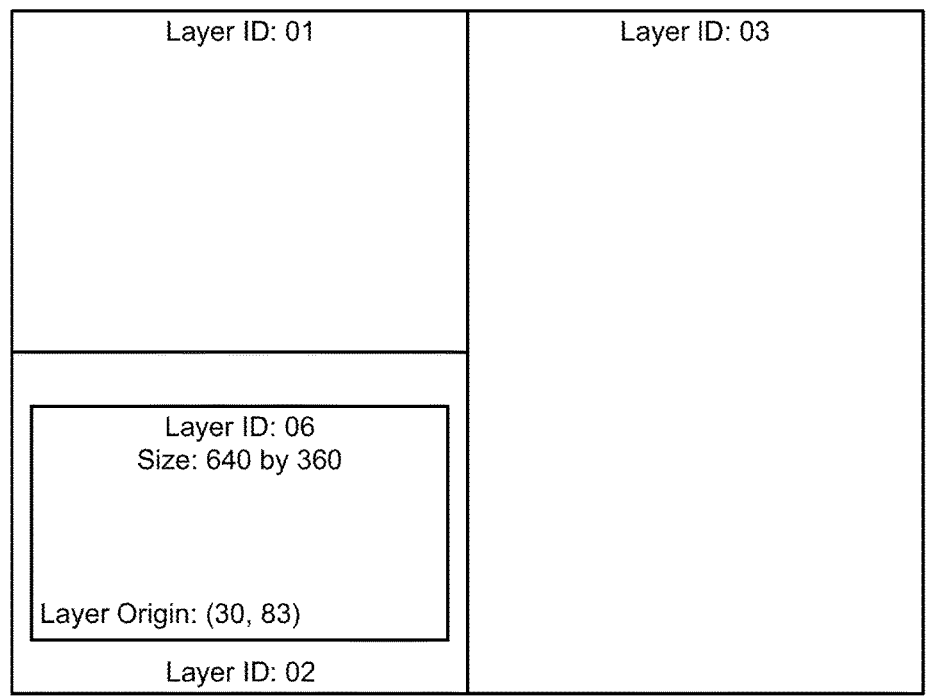
FIG. 6B depicts the exemplary display surface format of FIG. 2D with assigned layers.

FIGS. 6A through 6D illustrate the local display unit 180 and the exemplary display surface format of FIG. 2D that may be used for the simultaneous depiction of images facilitated by the use of the ARINC 661 interface protocol between the CDS 130 and the remote aircraft system 120-1 simultaneously with the use of the VNC interface protocol between the CDS 130 and remote aircraft system 120-2. Referring to FIG. 6A, the remote image of FIG. 3A is shown simultaneously with the local image of FIG. 2A when applied to the display surface format of FIG. 2D; as stated above, the remote image may or may not be depicted simultaneously on the remote display unit 122. In the example presented in FIGS. 6A through 7C, personnel in the cockpit have access to and view the same image as personnel in the cabin.

Referring to FIG. 6B, layer 06 overlays with layer 02 in window 2 in the display surface format of FIG. 2D. Layer 06 originates at window pixel location (30, 83) which means it is approximately centered on window 2; in this example, a scaling factor of 0.5 has been applied as the size of layer 06 of 640 by 360 pixels indicates.

Figure 6C:
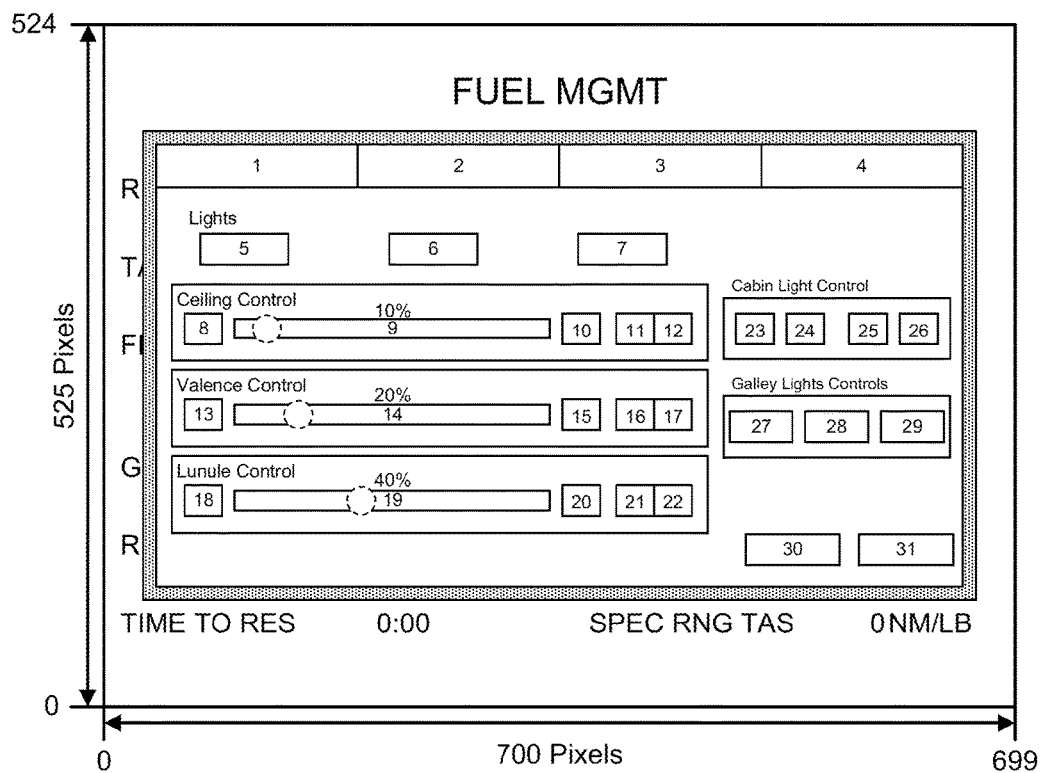
FIG. 6C depicts a map of the interactive widgets of the exemplary display surface format of FIG. 3B against part of the local image of FIG. 2A.

Referring to FIG. 6C, the map of the 31 interactive widgets shown in FIG. 3B is shown in place of its respective image shown of FIG. 4A as depicted over the "FUEL MGMT" panel of the lower left half of the control panel shown of FIG. 6A. Because the image occupies the area of layer 06 and because layer 06 originates at window pixel location (30, 83), the origin of each of the widgets is different than listed in the map table of FIG. 3B. Referring to the map table of FIG. 6D, the X(ref) and Y(ref) locations of FIG. 6C are found by adding 30 and 83 to one-half the X(ref) and Y(ref) locations of FIG. 3B, respectively, where the one-half corresponds to the scaling factor; additionally, the X(size) and Y(size) of each widget has been reduced by one-half because a scaling factor of 0.5 has been applied.

Figures 6D, 7A:
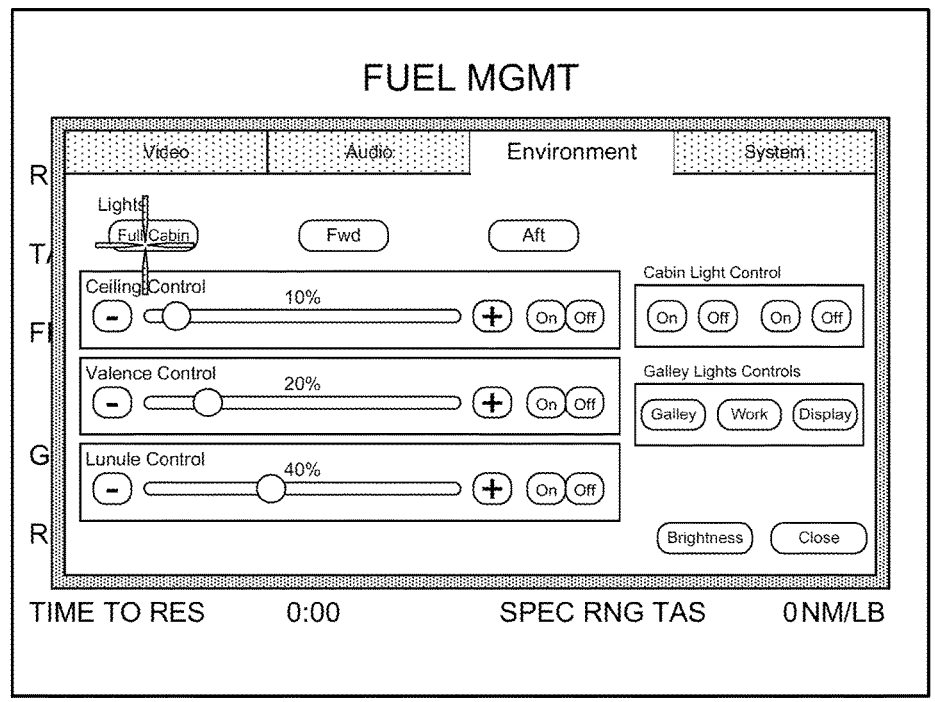
FIG. 6D depicts a map table corresponding to the map of the interactive widgets of FIG. 6C.
FIG. 7A depicts a selection made on a second local image shown on a local display unit.
Figure 7B:
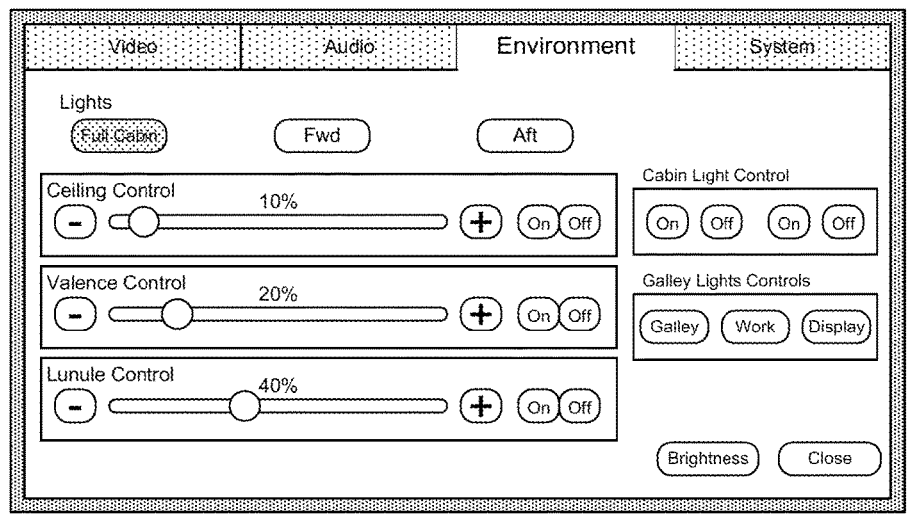
FIG. 7B depicts a change to the remote image corresponding to the selection of FIG. 7A.
Figure 7C:
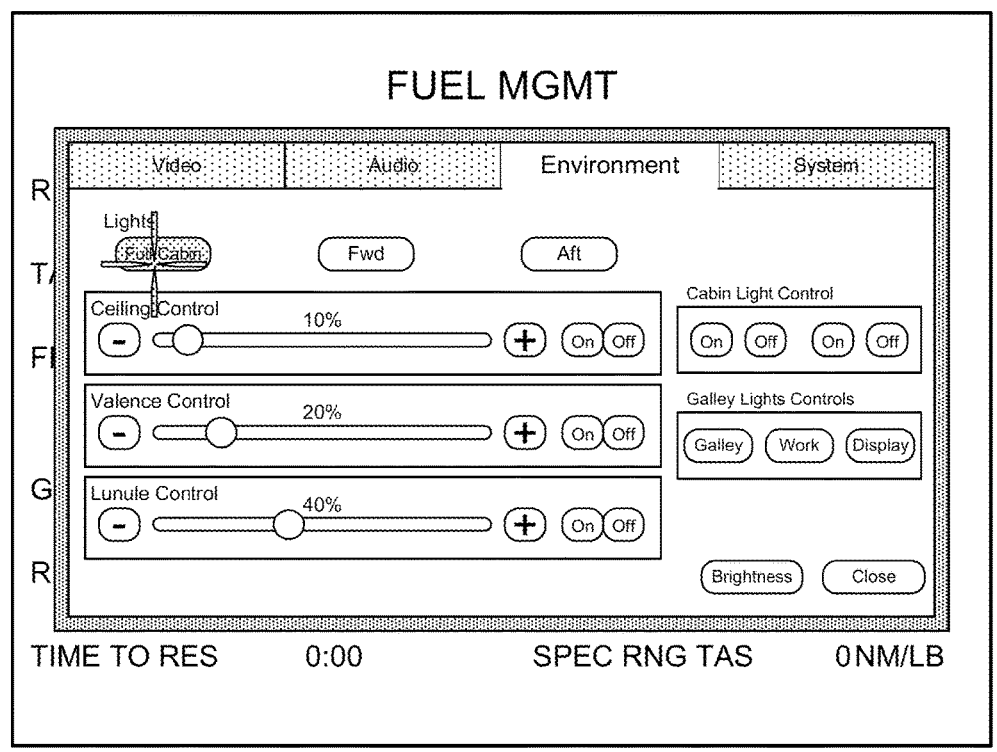
FIG. 7C depicts a change to the local image corresponding to the change of FIG. 7B.

For the example illustrated by FIGS. 7A through 7C, it will be assumed that personnel in the cockpit want to turn on the lights to the full cabin and move the lunule control to 80% as in FIGS. 5A through 5C; however, the exemplary display surface format shown in FIG. 2D that has been employed in FIGS. 6A through 6D will be used.

As shown in FIG. 7A, a cursor has been added to image of FIG. 6A, where the cursor is located over the "Full Cabin" push button of the VNC image widget. Moreover, the VNC image widget has been manually selected by the pilot pressing and releasing the cursor's button. When the cursor's button is pressed, the PM 170 may be programmed to capture the surface coordinates of the cursor's location (103, 361) and convert them into layer coordinates (146, 556), where the X(layer)=(103-30)/0.5 and Y(layer)=(361-83)/0.5 (where 0.5 is the scaling factor). Because an interaction with a VNC image widget has occurred, the PM 170 may notify the WMUA 160 of the event and provide the current state of the cursor's button (e.g., the cursor's button has been pressed) and the layer coordinates of the cursor's event in the notification. In response, the WMUA 160 could forward data representative of the notification to the VNC client 0001 which, in turn, could generate and send two client-to-server messages in VNC protocol to the VNC server 0001 of the remote aircraft system 120-2.

Following the same discussion as presented above for the first message, the VNC client 0001 may generate and send data representative of a client-to-server message to the VNC server 0001 notifying it of the current state of the cursor's button and the event location of the cursor. As this message is received by the VNC server 0001, the remote aircraft system 120-2 may respond as if personnel had pressed the surface at given location (146, 556) of the remote display unit 122; that is, the remote aircraft system 120-2 may respond as if personnel had manually selected the "Full Cabin" interactive widget on the remote display unit 122. This response is indicated in FIG. 7B by the change of appearance of "Full Cabin" interactive widget (as well as the lights in the full cabin being turned on). If the remote image's cursor is present, it could have been located on top of the interactive widget; unlike in FIG. 5B, however, the configuration of the remote display unit 122 of FIG. 7B does not include a cursor.

Following the same discussion as presented above for the second message, the VNC client 0001 may generate and send a client-to-server request comprised of data representative of a request for updated RFB information, either the entire RFB or a limited-area RFB. As shown in the map table of FIG. 3B, layer coordinates (146, 556) fall within the area of position 5 which corresponds to a "Full Cabin" pushbutton switch. After referring to the table, the request for a limited area of the RFB may correspond to X(ref)=90, Y(ref)=546, X(size)=140, and Y(size)=50.

In response to receiving the second message, the VNC server 0001 may generate and send data representative of a server-to-client message in VNC protocol to the VNC client 0001 providing it with the updated RFB data of either the entire RFB or the limited-area RFB. In response, the VNC client 0001 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 7C is represented in the newly-incorporated pixel data set.

Figures 8A, 8B:
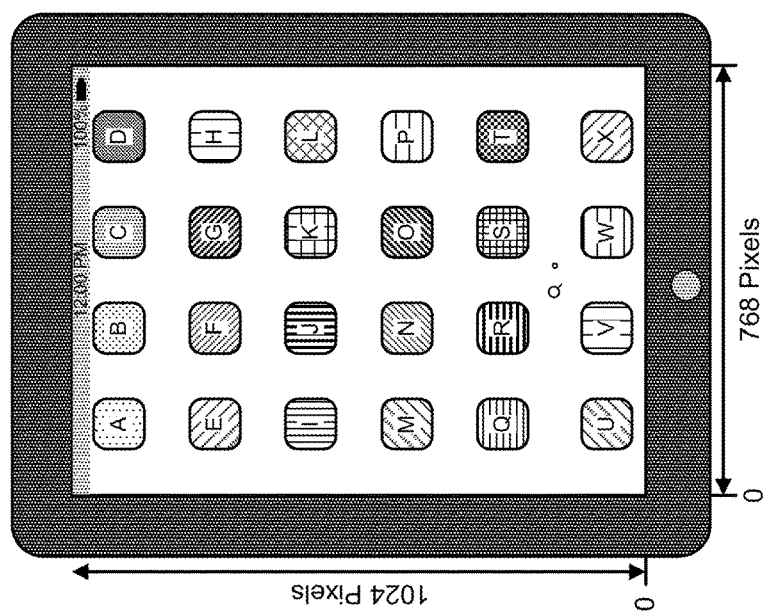
FIG. 8A depicts a remote display unit of a remote non-aircraft system and a first exemplary remote image presented thereon.
FIG. 8B illustrates an exemplary display surface format for displaying the first exemplary remote image of FIG. 8A.
Figure 8C:
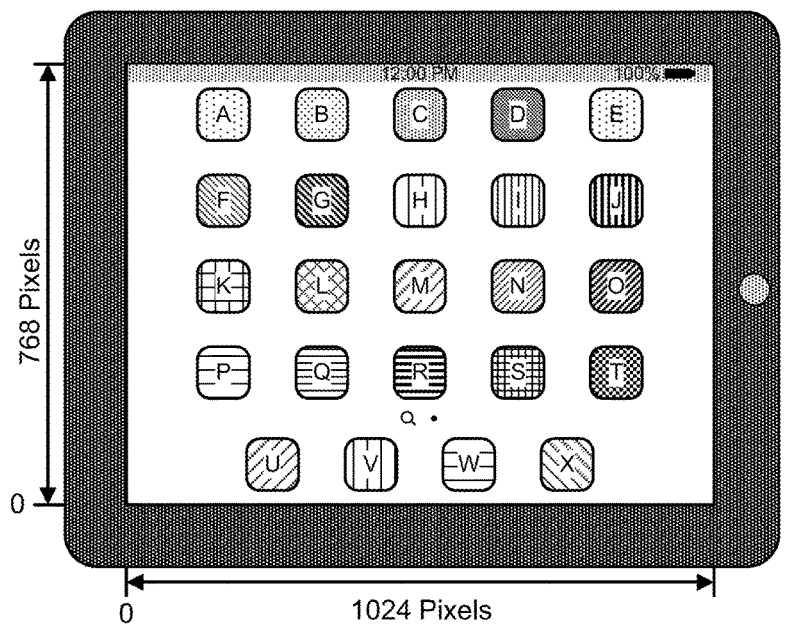
FIG. 8C depicts a remote display unit of a remote non-aircraft system and a second exemplary remote image presented thereon.
Figure 8D:
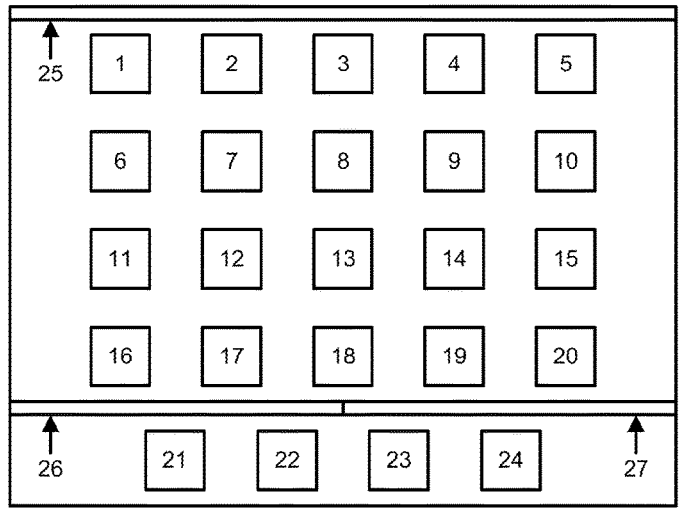
FIG. 8D illustrates an exemplary display surface format for displaying the second exemplary remote image of FIG. 8C.

FIGS. 8A and 8C illustrate two remote images depicted on the surface of the remote display unit 126 in a portrait orientation and a landscape orientation respectively; FIGS. 8B and 8D illustrate two exemplary display surface formats that may be used to depict the remote images of FIGS. 8A and 8C respectively. For the purpose of illustration and not limitation, FIGS. 8A and 8C illustrate a remote display unit 126 comprised of an iPad having a surface area of 768 by 1024 pixels in the portrait orientation and 1024 by 768 pixels in the landscape orientation, where the remote display unit 126 depicts a plurality of interactive widgets. As shown in these illustrations, the interactive widgets may facilitate the interaction between a user of the iPad and an application available to the user by tapping on one or more interactive widgets. For the purpose of illustration, the iPad will be discussed, and although the following discussion will be drawn to the images of FIGS. 8A and 8C, the embodiments disclosed herein are not limited to merely an iPad. Instead, the embodiments disclosed herein could be applied to both portable or non-portable devices such as, but not limited to, other tablet devices, electronic flight bags, smartphones, laptop computers, and/or desktop computers irrespective of location (i.e., internal or external to the aircraft) with which the PM 170 is in communication and in which one or more applications are installed and/or accessible to a user.

Referring to FIG. 8B, the exemplary display surface format shown corresponds to the remote image of FIG. 8A and has a single window originating from surface pixel location (0, 0) occupying the entire display surface area of 768 by 1024 pixels of the portrait orientation. The window is comprised of a single layer originating at window pixel location (0, 0) and has the size of 768 by 1024 pixels. The layer is comprised of 27 interactive widgets corresponding to icons labeled A through X (positions 1-24), a status bar (position 25), and change screen rows (positions 26 and 27). Similar to FIG. 3B, the location of the origin of each interactive widget and its size are shown in the map table of FIG. 8B. As embodied herein, remote aircraft system 124-1 owns the window, layer, and interactive widgets of FIG. 8B.

Referring to FIG. 8D, the exemplary display surface format shown corresponds to the remote image of FIG. 8C and has a single window originating from surface pixel location (0, 0) occupying the entire display surface area of 1024 by 768 pixels for the landscape orientation. The window has a single layer originating at window pixel location (0, 0) and has the size of 1024 by 768 pixels. The layer includes the same 27 interactive widgets of FIG. 8B, and similar to FIGS. 3B and 8B, the location of the origin of each interactive widget and its size are shown in the map table of FIG. 8D. As embodied herein, remote aircraft system 124-1 owns the window, layer, and interactive widgets of FIG. 8D.

Figure 9A:
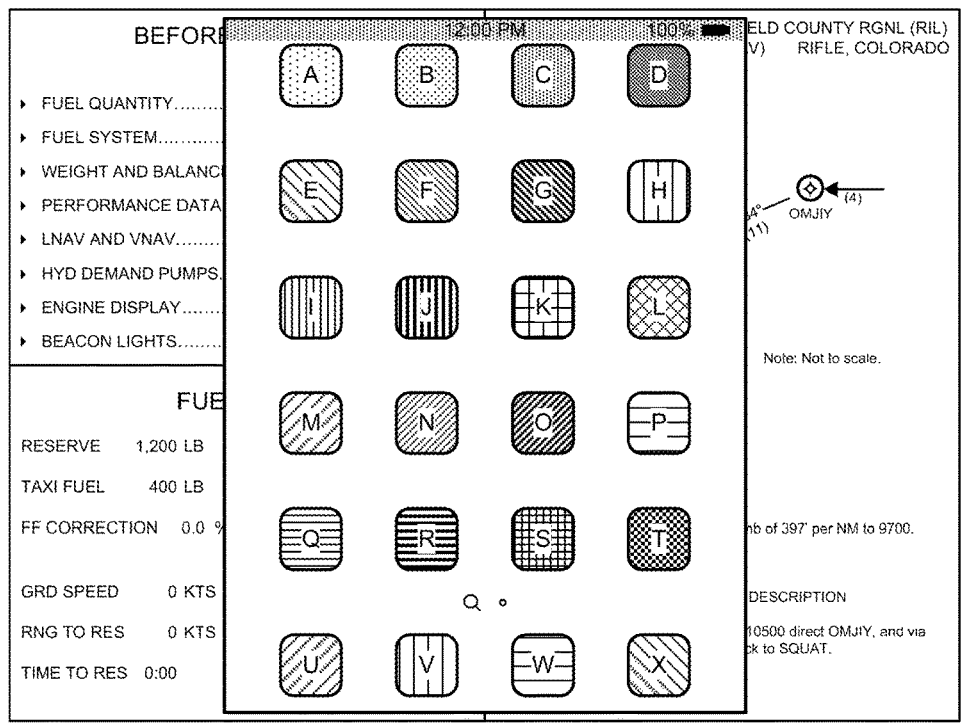
FIG. 9A depicts the first exemplary remote image of FIG. 8A simultaneously with the exemplary local image of FIG. 2A when applied to the exemplary display surface format of FIG. 2B.
Figure 9B:
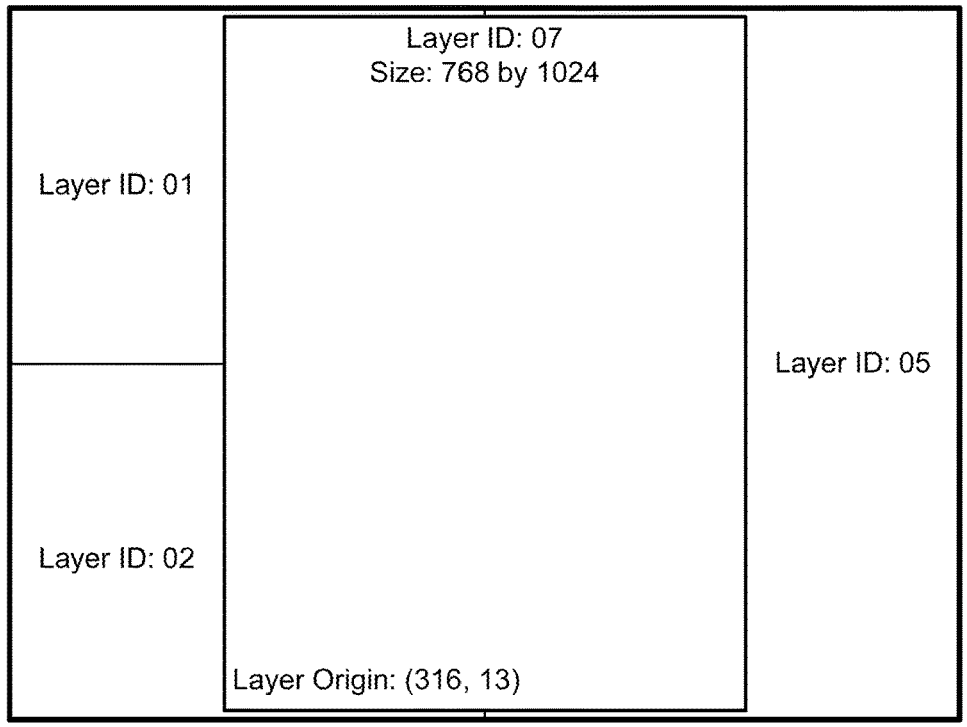
FIG. 9B depicts the exemplary display surface format of FIG. 2B with assigned layers.
Figures 9C, 9D:
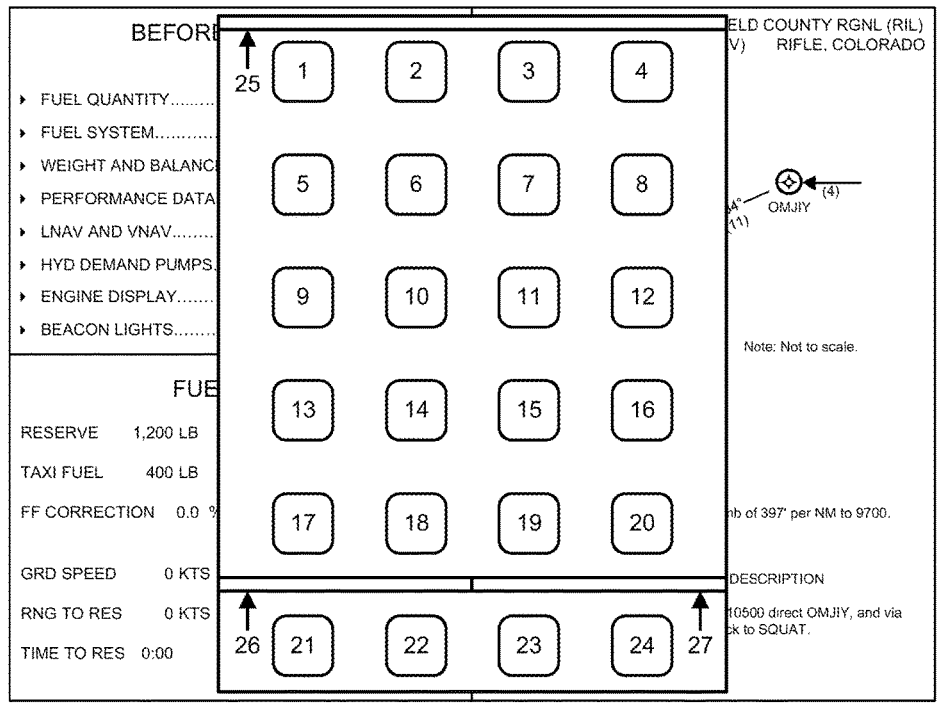
FIG. 9C depicts a map of the interactive widgets of the exemplary display surface format of FIG. 9B against the local image of FIG. 2A.
FIG. 9D depicts a map table corresponding to the map of the interactive widgets of FIG. 9C.
Figure 9E:
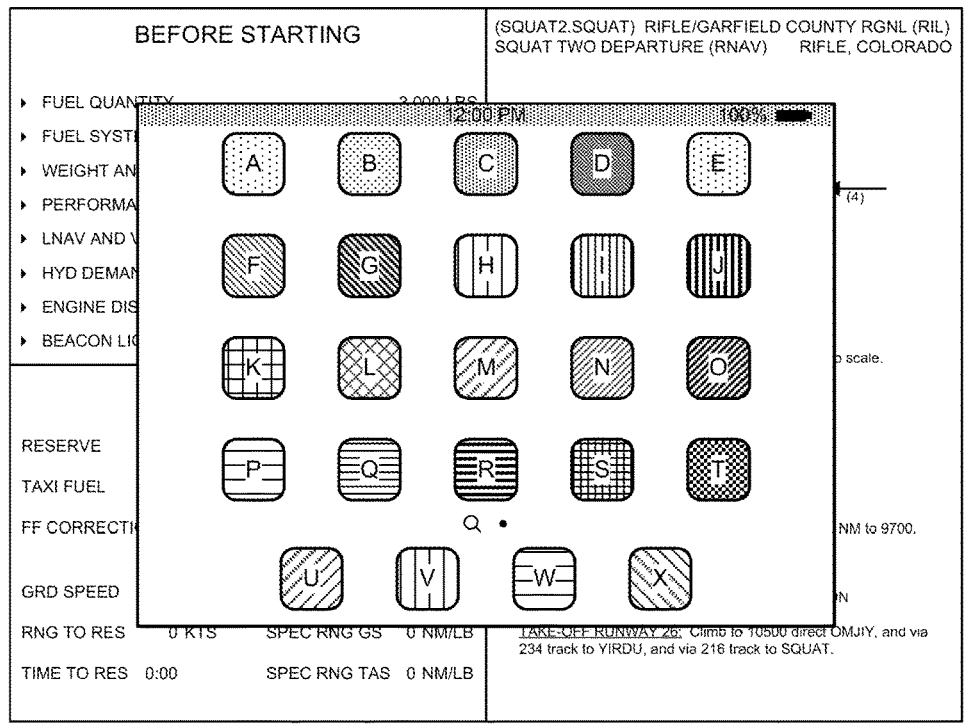
FIG. 9E depicts the second exemplary remote image of FIG. 8C simultaneously with the exemplary local image of FIG. 2A when applied to the exemplary display surface format of FIG. 2B.

FIGS. 9A through 9H illustrate the local display unit 180 and the exemplary display surface format of FIG. 2B that may be used for the simultaneous depiction of images facilitated by the use of the ARINC 661 interface protocol between the CDS 130 and the remote aircraft system 120-1 simultaneously with the use of the VNC interface protocol between the CDS 130 and the remote non-aircraft system 124-1. Referring to FIGS. 9A and 9E, the remote images of FIGS. 8A and 8C, respectively, are shown simultaneously with the local image of FIG. 2A when applied to the display surface format of FIG. 2B; moreover, the remote images may or may not be depicted simultaneously on the remote non-aircraft system 124-1. In the examples presented in FIGS. 9A through 10H, personnel in the cockpit have access to and view the same image as personnel viewing the remote image.

To arrive at the local image shown in FIGS. 9A and 9E in one embodiment, a pilot may have accessed a menu using the pilot input device 110, where the ability to display a menu upon a pilot's request is known to those skilled in the art. From the menu, the pilot could have made a request to enable him or her to interact with the remote non-aircraft system 124-1 without leaving the cockpit. When the request is made, data representative of the pilot input could be received by the PM 170, where the input data may correspond to a request to display the remote image. In response, the PM 170 could activate layers 07 and/or 08 as well as generate and send data representative of a request to display the remote image to the WMUA 160. As embodied herein, the data could be sent using ARINC 661 protocol and the request could be comprised of a notice to the WMUA 160 that layers 07 and/or 08 has been activated. In response, the WMUA 160 could forward data representative of the request to the VNC client 0002 which, in turn, could generate and send data representative of a client-to-server message in VNC protocol to the VNC server 0002 requesting RFB data.

In response, the VNC server 0002 could generate and send data representative of a server-to-client message in VNC protocol to the VNC client 0002 providing RFB data which includes data representative of the portrait or landscape orientation; RFB widths of 768 pixels and 1024 pixels indicate portrait and landscape orientations, respectively. In response, the VNC client 0002 could forward the RFB data to the WMUA 160. In response, the WMUA 160 could turn "on" at least a visibility parameter of the VNC image widget as well as generate and send VNC image widget data corresponding to the RFB data to the PM 170. As embodied herein, the VNC image widget data could be sent using ARINC 661 protocol and include in it a request to turn "on" the visibility property of layer 07 if the RFB data represents the portrait orientation (and a request to deactivate layer 08 if previously activated) or the visibility property of layer 08 if the RFB data represents the landscape orientation (and a request to deactivate layer 07 if previously activated). In addition, the WMUA 160 could apply a scaling factor if a scaling factor of one is not applied and/or truncate the RFB data if the WMUA 160 is configured as such. In response, the PM 170 could incorporate the VNC image widget data into the existing pixel data set being used, such that a VNC image widget indicative of the remote images shown in FIG. 9A or 9E is represented in the incorporated pixel data set.

Figure 9F:
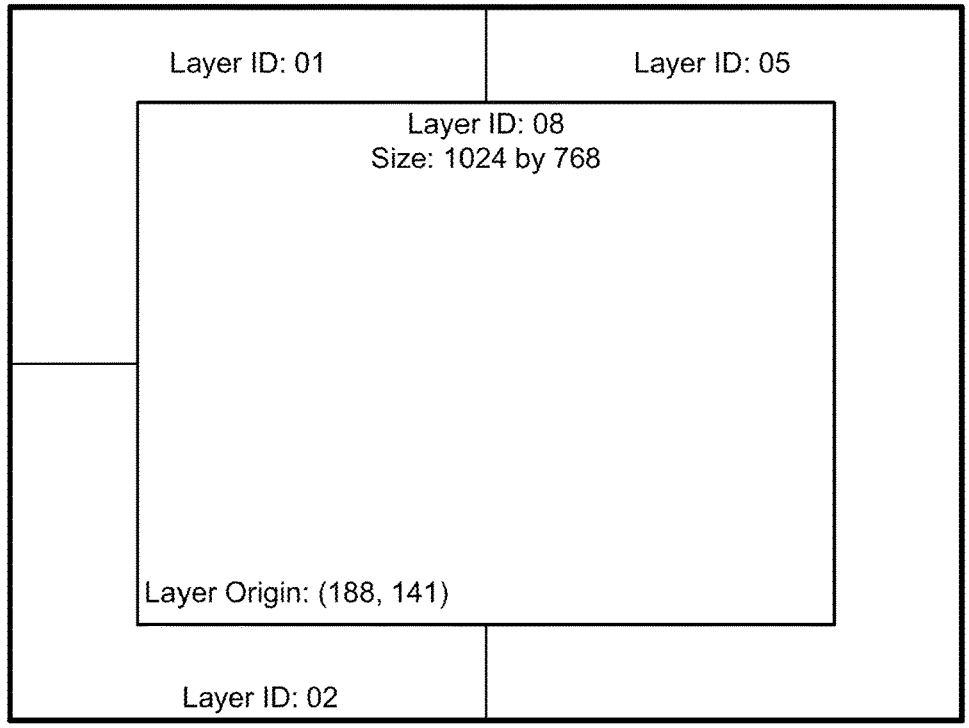
FIG. 9F depicts the exemplary display surface format of FIG. 2B with assigned layers.

Referring to FIGS. 9B and 9F, the exemplary display surface format of FIG. 2B overlays layer 07 and 08, respectively, with layers 01, 02, and 05. Layer 07 originates at window pixel location (316, 13) and layer 08 originates at window pixel location (188, 141) which means both are centered on the window; the size of layers 07 and 08 are 768 by 1024 pixels and 1024 by 768 pixels, respectively, which means a scaling factor of one has been applied to both. Since the window for this display surface format has the same size as the surface of the local display unit 180 and layers 07 and 08 are centered on the window; layers 07 and 08 are also centered on the surface of the local display unit 180.

Figures 9G, 9H:
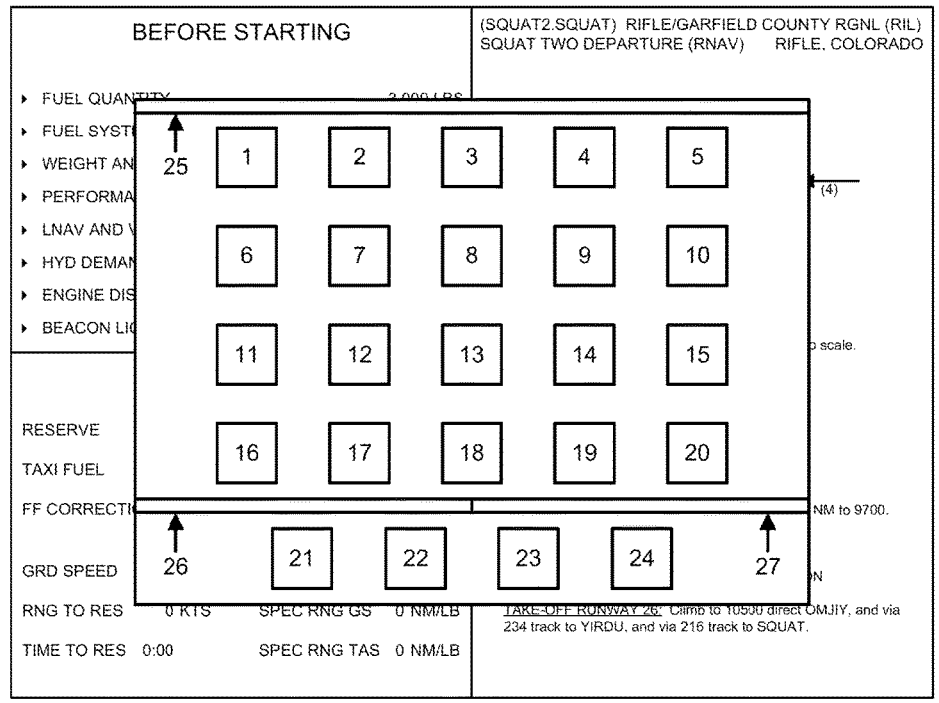
FIG. 9G depicts a map of the interactive widgets of the exemplary display surface format of FIG. 9F against the local image of FIG. 2A.
FIG. 9H depicts a map table corresponding to the map of the interactive widgets of FIG. 9G.

Referring to FIGS. 9C and 9G, the maps of the 27 interactive widgets shown in FIGS. 8B and 8D, respectively, are shown in place of their respective images shown of FIGS. 9A and 9E. Because the images occupy the areas of layers 07 and 08, respectively, and because layer 07 and layer 08 originate at window pixel location (316, 13) and (188, 141), respectively, the origin of each of the widgets is different than listed in the map tables of FIGS. 8B and 8D. Referring to the map table of FIG. 9D, the locations of X(ref) and Y(ref) for each widget are increased by 316 and 13 pixels, respectively; however, the size of each widget indicated by its X(size) and Y(size) remains the same because the scaling factor of one has been applied. Referring to the map table of FIG. 9H, the locations of X(ref) and Y(ref) for each widget are increased by 316 and 13 pixels, but the size of each widget indicated by its X(size) and Y(size) remains the same.

It should be noted that the each of the 27 widgets have lost their interactive character as a result of the VNC protocol. The VNC server 0002 may send data representative of server-to-client message to the VNS client 0002 via the PM 170. The server-to-client message may include VNC RFB information which includes portrait orientation information. The data sent by the VNS server 0002 may inform the VNS client about the number of rectangles included in the data, the location and size of each rectangle data. Then, the location of each rectangle could be translated into location information corresponding to layer 07 or layer 08 and the size of each rectangle could be scaled into size information corresponding to layer 07 or layer 08. Then, image data representative of the translated location information and scaled size information could be generated and sent to the display unit, where the image represented in the image data could be presented in the area of layer 07 or layer 08.

Figure 10B:
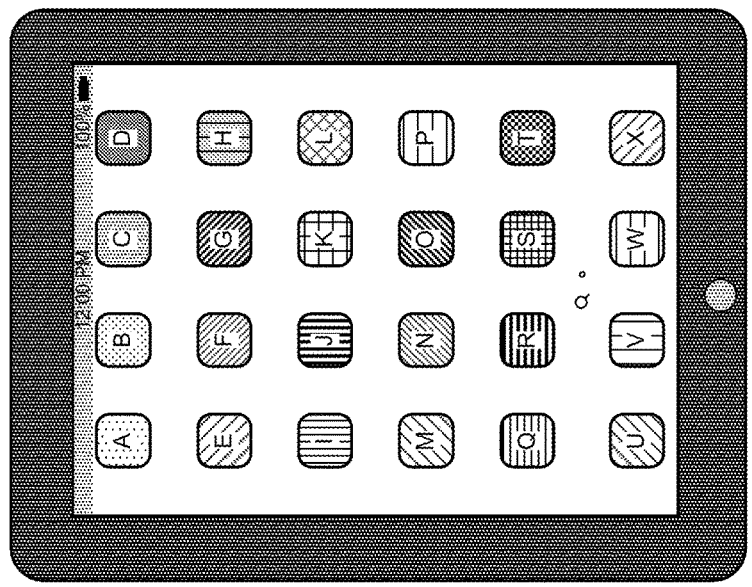
FIG. 10B depicts a first change to the remote image corresponding to the selection of FIG. 10A.
Figure 10A:
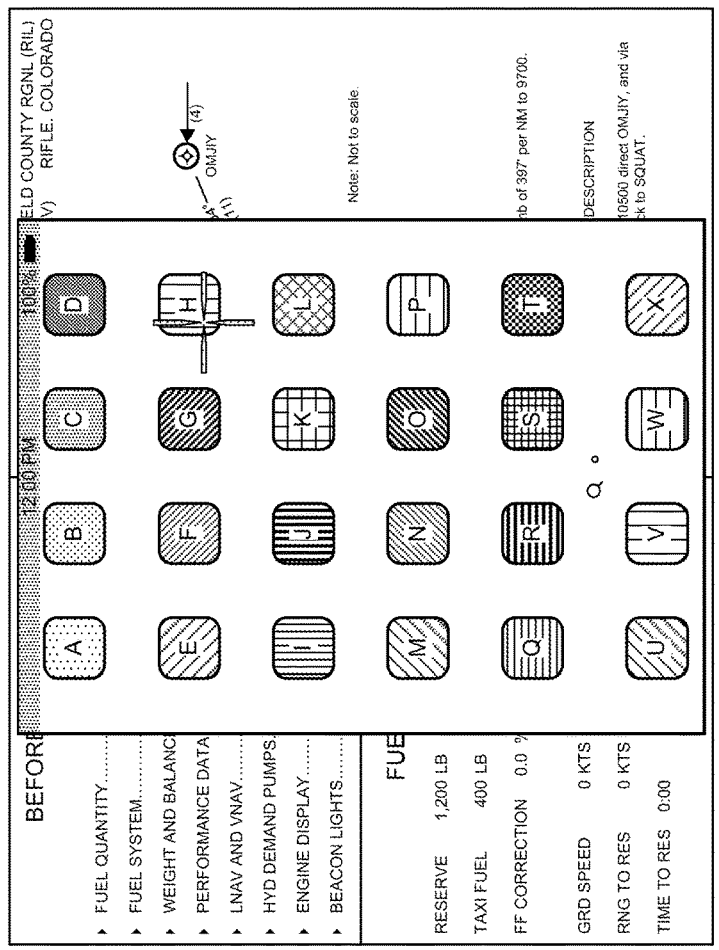
FIG. 10A depicts a selection made on a first local image shown on a local display unit.
Figure 10D:
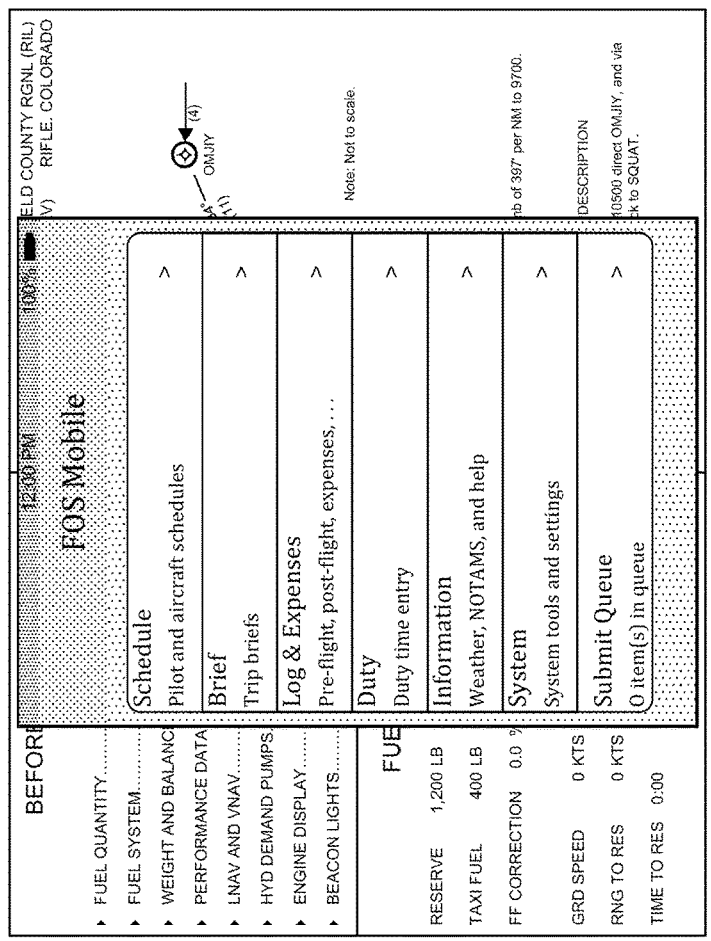
FIG. 10D depicts a change to the local image corresponding to the change of FIG. 10C.
Figure 10C:
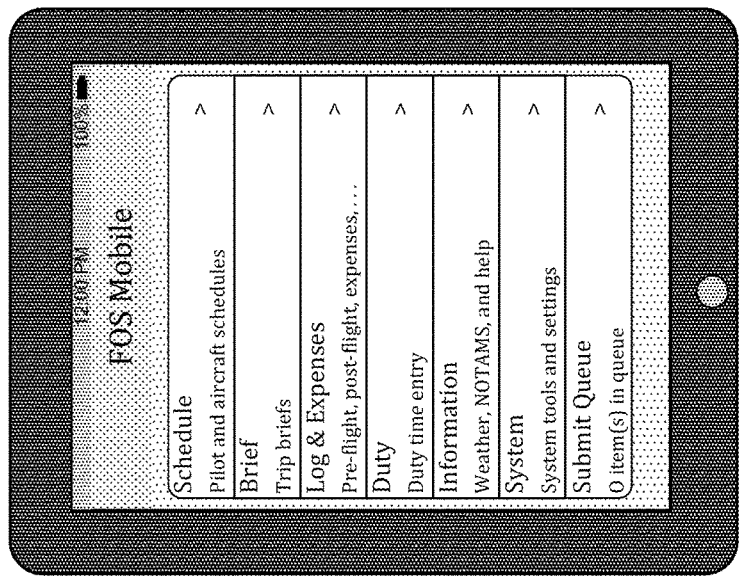
FIG. 10C depicts a second change to the remote image after the first change of FIG. 10B.
Figures 10E, 10F:
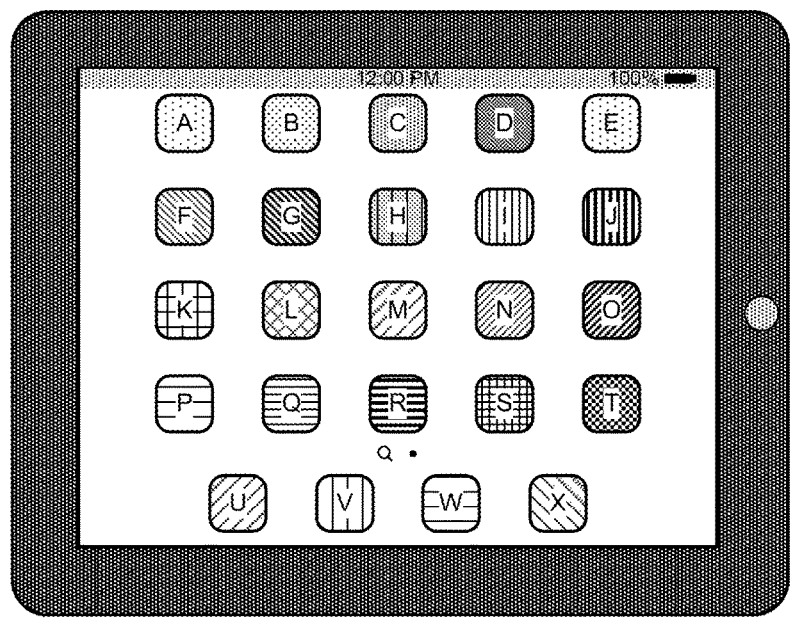
FIG. 10E depicts a selection made on a second local image shown on a local display unit.
FIG. 10F depicts a first change to the remote image corresponding to the selection of FIG. 10E.

In the examples discussed in FIGS. 10A through 10H, it will be assumed that personnel in the cockpit want to access a Flight Operations System ("FOS") application known as FOS Mobile, a comprehensive flight operations management and support system supplied by Rockwell Collins, Inc. to operators in the aviation industry such as, but not limited to, corporate, charter, and government aviation as well as regional airlines, aircraft management, and fractional ownership companies; FOS Mobile is accessible by tapping the "H" interactive widget of the remote display unit 126. As shown in FIGS. 10A and 10E, a cursor has been added to each of the images of FIGS. 9A and 9E, respectively, where each cursor is located over the "H" icon of the VNC image widget. Moreover, the VNC image widget has been manually selected by the pilot pressing and releasing the cursor's button.

When the cursor's button is pressed in FIG. 10A, the PM 170 may be programmed to capture the surface coordinates of the cursor's location (940, 755) and convert them into layer coordinates (624, 742), where the X(layer)=940−316 and Y(layer)=755−13. Because an interaction with a VNC image widget has occurred, the PM 170 may notify the WMUA 160 of the event and provide the current state of the cursor's button and the layer coordinates of the cursor's event in the notification. In response, the WMUA 160 could forward data representative of the notification to the VNC client 0002 which, in turn, could generate and send two client-to-server messages in VNC protocol to the VNC server 0002 of the remote non-aircraft system 124-1.

In the first message, the VNC client 0002 may generate and send data representative of a client-to-server message to the VNC server 0002 notifying it of the current state of the cursor's button (i.e., pressed) and the event location of the cursor. As this message is received by the VNC server 0002, the remote non-aircraft system 124-1 may respond as if personnel had pressed the surface at given location (624, 742) of the remote display unit 126; that is, the remote non-aircraft system 124-1 may respond as if personnel had manually selected the "H" interactive widget on the remote display unit 126. This response is indicated in FIG. 10B by a change of appearance of "H" interactive widget followed by the appearance of a main menu of FOS Mobile as shown in FIG. 10C. It should be noted that, if the remote non-aircraft system 124-1 is other than an iPad, a cursor could have been located on top of the interactive widget if one is employed.

In the second message, the VNC client 0002 may generate and send a client-to-server request comprised of data representative of a request for updated RFB information. In one embodiment, information about the entire RFB may be requested. In another embodiment, information about a limited area of the RFB may be requested when a map of the interactive widgets of the remote display has been made available to the PM 170 as a cross-reference. As shown in the map table of FIG. 8B, layer coordinates (624, 742) fall within the area of position 8 which corresponds to the "H" interactive widget. After referring to the table, the request for a limited area of the RFB may correspond to X(ref)=596, Y(ref)=724, X(size)=90, and Y(size)=90. It should be noted that, until updated RFB information has been sent to the CDS 130, there will be no change in the appearance of the VNC image widget depicted on the local display unit 180 as shown in FIG. 10A.

In response to receiving the second message, the VNC server 0002 may generate and send data representative of a server-to-client message in VNC protocol to the VNC client 0002 providing it with the updated RFB data of either the entire RFB or the limited-area RFB. In response, the VNC client 0002 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 10D is represented in the newly-incorporated pixel data set.

The sequence of events described for FIGS. 10A through 10D may apply to the sequence of FIGS. 10E through 10H. When the cursor's button is pressed in FIG. 10E, the PM 170 may be programmed to capture the surface coordinates of the cursor's location (673, 644) and convert them into layer coordinates (485, 503), where the X(layer)=673−188 and Y(layer)=644−141. Because an interaction with a VNC image widget has occurred, the PM 170 may notify the WMUA 160 of the event and provide the current state of the cursor's button and the layer coordinates of the cursor's event in the notification. In response, the WMUA 160 could forward data representative of the notification to the VNC client 0002 which, in turn, could generate and send two client-to-server messages in VNC protocol to the VNC server 0002 of the remote non-aircraft system 124-1.

Figure 10G:
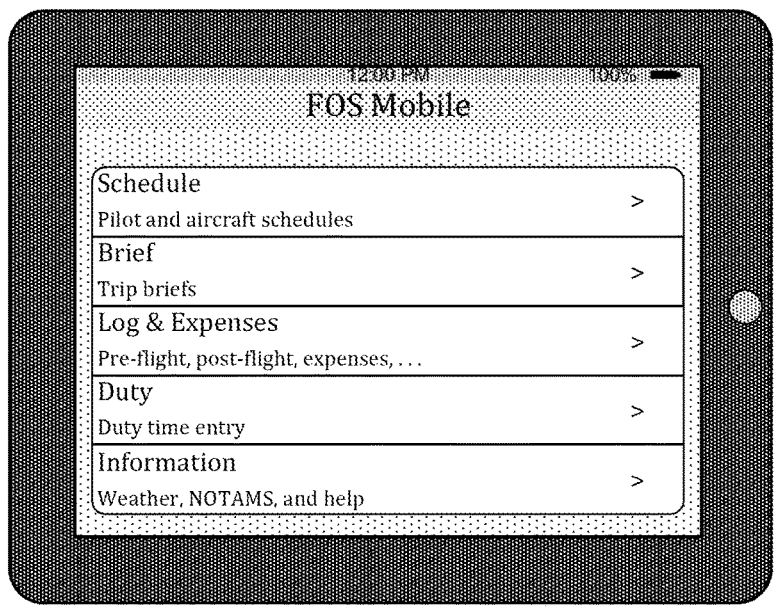
FIG. 10G depicts a second change to the remote image after the first change of FIG. 10F.

Following the same discussion as presented above for the first message, the VNC client 0002 may generate and send data representative of a client-to-server message to the VNC server 0002 notifying it of the current state of the cursor's button (i.e., pressed) and the event location of the cursor. As this message is received by the VNC server 0002, the remote non-aircraft system 124-1 may respond as if personnel had pressed the surface at given location (485, 503) of the remote display unit 126; that is, the remote non-aircraft system 124-1 may respond as if personnel had manually selected the "H" interactive widget on the remote display unit 126. This response is indicated in FIG. 10F by a change of appearance of "H" interactive widget followed by the appearance of a main menu of FOS Mobile as shown in FIG. 10G.

Following the same discussion as presented above for the second message, the VNC client 0002 may generate and send a client-to-server request comprised of data representative of a request for updated RFB information. In one embodiment, information about the entire RFB may be requested. In another embodiment, information about a limited area of the RFB may be requested when a map of the interactive widgets of the remote display has been made available to the PM 170 as a cross-reference. As shown in the map table of FIG. 8D, layer coordinates (485, 503) fall within the area of position 8 which corresponds to the "H" interactive widget. After referring to the table, the request for a limited area of the RFB may correspond to X(ref)=467, Y(ref)=485, X(size)=90, and Y(size)=90. It should be noted that, until updated RFB information has been sent to the CDS 130, there will be no change in the appearance of the VNC image widget depicted on the local display unit 180 as shown in FIG. 10E.

Figure 10H:
FIG. 10H depicts a change to the local image corresponding to the change of FIG. 10G.

In response to receiving the second message, the VNC server 0002 may generate and send data representative of a server-to-client message in VNC protocol to the VNC client 0002 providing it with the updated RFB data of either the entire RFB or the limited-area RFB. In response, the VNC client 0002 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 10HD is represented in the newly-incorporated pixel data set.

It should be noted that, although the remote non-aircraft system 124-1 responded to pressing of the cursor's button, a manufacturer and/or end-user could have configured the remote non-aircraft system 124-1 to respond when the cursor's button has been released and not when it's been pressed. In such configuration, the current state of the cursor's button in the first message generated by the WMUA 160 could have corresponded to the releasing of the cursor's button instead of the pressing of the cursor's button. Alternatively, an additional message corresponding to the releasing of the cursor's button could have been generated by the WMUA 160 in sequence after the first message but before the second message.

Although it will not be discussed herein, the embodiments of FIGS. 8A through 10H are not limited to the exemplary display surface format of FIG. 2B but apply equally to other display surface formats. Following the same discussion as presented above for FIGS. 6A through 7C, there could be a simultaneous depiction of images facilitated by the use of the ARINC 661 interface protocol between the CDS 130 and the remote aircraft system 120-1 with images facilitated by the use of the VNC interface protocol between the CDS 130 and remote non-aircraft system 124-1.

Figure 11:
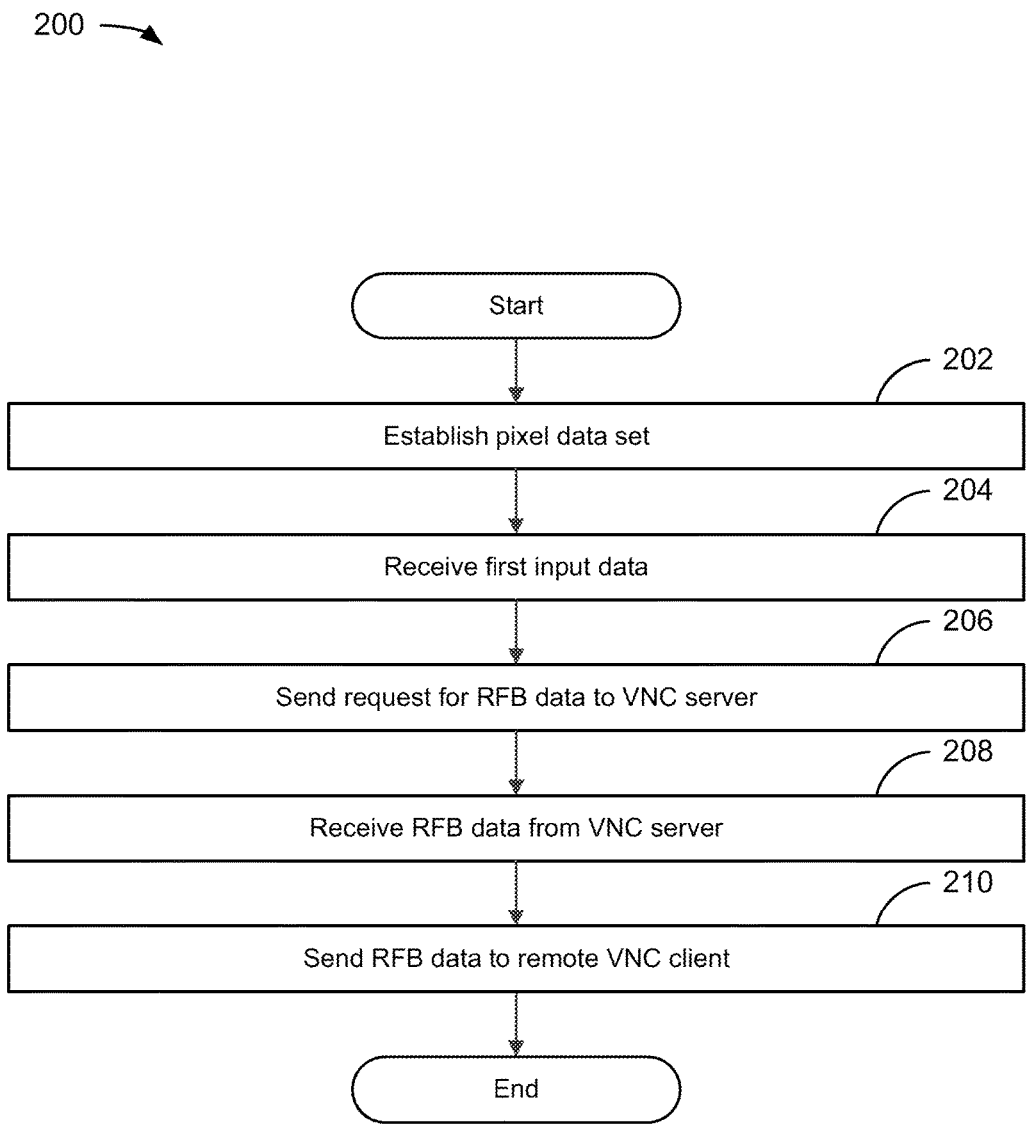
FIG. 11 illustrates a flowchart disclosing an embodiment of a first method for incorporating VNC into the CDS.

FIG. 11 depicts flowchart 200 providing an example for incorporating VNC into the CDS 130, where the CDS 130 includes a VNC server such as VNC server 0003 and the remote non-A/C system 124-2 includes a VNC client 0003. The PM 170 may be programmed or configured with instructions corresponding to the following modules of flowchart 200. As embodied herein, the PM 170 may be a processor unit of a module such as, but not limited to, a printed circuit card assembly having one or more input interfaces (e.g., virtual or physical computer ports) to facilitate data communications with the PM 170, i.e., the receiving and providing of data (e.g., one or more electrical or optical signals including data and/or being indicative of data). For the accomplishment of the following modules embodied in FIGS. 11 and 12, the receiving of data is synonymous and/or interchangeable with the retrieval of data, and the providing of data is synonymous and/or interchangeable with the making available, supplying, and/or sending of data.

The method of flowchart 200 begins with module 202 with the PM 170 establishing a pixel data set representative of an image. The image may include one or more non-VNC widgets, where each non-VNC widget could be based upon corresponding non-VNC widget data from at least one user application.

The method of flowchart 200 continues with module 204 with the PM 170 generating or receiving input data sent, where this input data could be representative of a request for RFB data of the image to display the image on the remote display unit 128. In some embodiments, the input data could be generated in response to a request to display the image remotely originating from a pilot input device of a pilot wanting to share the image—or push the image—he or she is viewing on the local display unit 180 with personnel viewing the remote display unit 128 away from the aircraft such as, but are not limited to, personnel of a flight operations management department (e.g., a flight dispatcher) and personnel of an aircraft technical operations department (e.g., an aircraft mechanic); if so, the PM 170 may be configured with the functionality of a VNC client to generate the request for RFB data of the image in response to receiving the request to display. In some embodiments, the input data could be received from the remote VNC client 0003 of the remote non-aircraft system 124-2 by personnel seeking to view the image—or pull the image—being viewed by the pilot.

The method of flowchart 200 continues with module 206 with the PM 170 performing a first operation including sending the request for RFB data of the image to the VNC server 0003 in response to receiving input data. The method of flowchart 200 continues with module 208 with the PM 170 performing a second operation comprised of receiving responsive data from the VNC server 0003 responsive to the request and including RFB data of the image.

The method of flowchart 200 continues with module 210 with the PM 170 performing a third operation including sending the RFB data of the image to the remote VNC client 0003 of the remote non-aircraft system 124-2. The image represented in the pixel data set could be presented on the remote display unit 128.

A notification of the request for RFB data of the image may be presented to the pilot when the input data is received from the remote VNC client 0003. In some embodiments, the notification could be presented visually on the local display unit 180 as one or more non-VNC widgets representative of the notification. Knowing the layer to which such non-VNC widget are assigned, the PM 170 could activate the layer, send a notice of layer activation to a user application owning the layer, and in response to the notice of layer activation, receive non-VNC widget parameters and a request to activate the visibility of the layer; as such, the one or more non-VNC widgets representative of the notification may be presented on the local display unit 180. In some embodiments, the PM 170 could receive input data from the pilot input device 110 responsive to a selection of one of the non-VNC widgets being presented to the pilot of the local display unit 180, where the pilot could authorize or reject the display of the image on the remote display unit 128.

In some embodiments, the PM 170 could generate notification data representative of a notification of the request for RFB data of the image and present it to the pilot, where the presentation could be made on a non-ARINC 661 local display unit. In some embodiments, the notification data could be generated in response to third data being received as part of the input data from the remote VNC client 0003 or received separately, where the third data could be representative of the notification. In some embodiments, the PM 170 could receive input data from the pilot input device 110 responsive to the notification being presented to the pilot of the non-ARINC 661 local display unit, where the pilot could authorize or reject the display of the image on the remote display unit 128.

In some embodiments, the PM 170 could inhibit the performance of one or more of the first operation, the second operation, and the third operation unless the response to the notification is favorable, i.e., the pilot has authorized the display of the image. In some embodiments, the PM 170 could perform at least one of the first operation, the second operation, and the third operation repetitively with or without repetitively generating or receiving further input data. Then, the method of flowchart 200 ends.

Figure 12:
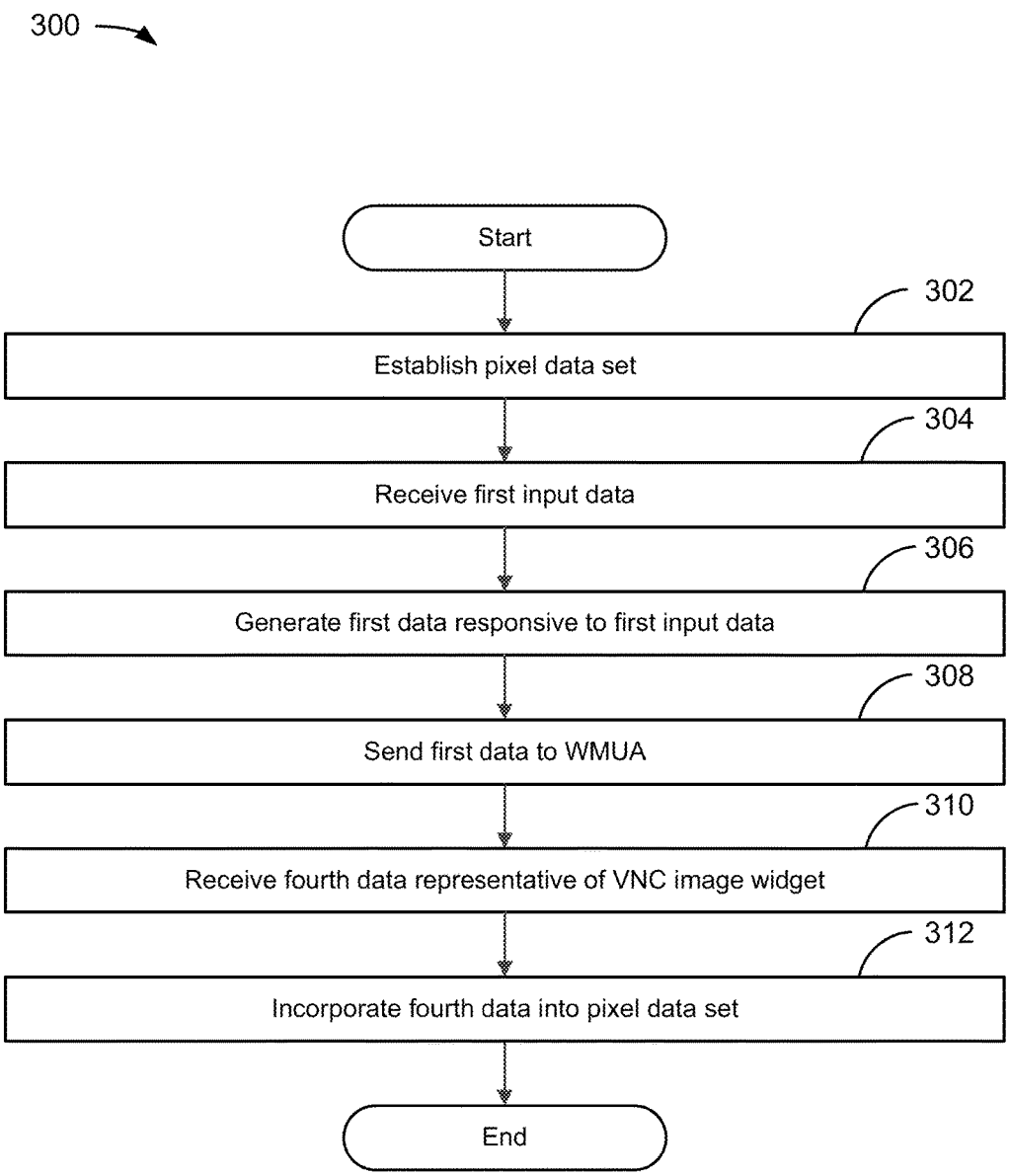
FIG. 12 illustrates a flowchart disclosing an embodiment of a second method for incorporating VNC into the CDS.

FIG. 12 depicts flowchart 300 providing an example for incorporating VNC into the CDS 130, where the CDS 130 includes a VNC client such as VNC client 0002 and the remote non-A/C system 124-1 includes a VNC server 0002. The PM 170 may be programmed or configured with instructions corresponding to the following modules.

The method of flowchart 300 begins with module 302 with the PM 170 establishing a pixel data set representative of a first image. The first image may include one or more non-VNC widgets, where each non-VNC widget could be based upon corresponding non-VNC widget data from at least one user application.

The method of flowchart 300 continues with module 304 with the PM 170 receiving input data. This input data could be representative of a request to display a second image of the remote display unit 126 on the local display unit 180. In some embodiments, the input data could be received from the remote non-aircraft system 124-1 by personnel seeking to share the second image—or push the second image—he or she in viewing on the remote display unit 126 with a pilot viewing the local display unit 180 in an aircraft.

The method of flowchart 300 continues with module 306 with the PM 170 performing a first operation comprised of generating first data in response to receiving input data. This first data could be representative of the request to display a second image, where the request to display a second image may include a notice of layer activation of the layer to which the VNC image widget is assigned.

The method of flowchart 300 continues with module 308 with the PM 170 performing a second operation including sending the first data to the WMUA 160. The VNC client 0002 of the WMUA 160 may be configured to generate second data representative of a request for RFB data of the second image; send the second data to the VNC server 0002; and receive third data from the VNC server 0002 responsive to the request for RFB data of the second image and including RFB data of the second image.

The method of flowchart 300 continues with module 310 with the PM 170 performing a third operation including receiving fourth data from the WMUA 160 in response to the first data. The fourth data may have been generated by the WMUA 160 in response to the VNC client receiving the third data comprised of the RFB data, where the fourth data could be representative of VNC image widget parameters and a request to activate the visibility of the layer to which the VNC image widget is assigned.

The method of flowchart 300 continues with module 312 with the PM 170 performing a fourth operation including incorporating the image comprised of at least a VNC image widget that may be presented on the local display unit 180 into the pixel data set.

A notification of the request for RFB data of the second image may be presented to the pilot when the input data is received. In some embodiments, the notification could be presented visually on the local display unit 180 as one or more non-VNC widgets representative of the notification. Knowing the layer to which such non-VNC widget are assigned, the PM 170 could activate the layer, send a notice of layer activation to a user application owning the layer, and in response to the notice of layer activation, receive non-VNC widget parameters and a request to activate the visibility of the layer; as such, the one or more non-VNC widgets representative of the notification may be presented on the local display unit 180. In some embodiments, the PM 170 could receive input data from the pilot input device 110 responsive to a selection of one of the non-VNC widgets being presented to the pilot of the local display unit 180, where the pilot could authorize or reject the display of the second image on the local display unit 180.

In some embodiments, the PM 170 could generate fifth data representative of a notification of the request to display the second image and send it to a non-ARINC 661 local display unit, where the notification could be presented to the pilot. In some embodiments, the fifth data could be generated in response to sixth data being received as part of the input data from the VNC client 0002 or received separately, where the sixth data could be representative of the notification. In some embodiments, the PM 170 could receive input data from the pilot input device 110 responsive to the notification being presented to the pilot of the local display unit 180, where the pilot could authorize or reject the display of the second image on the non-ARINC 661 local display unit.

In some embodiments, the PM 170 could inhibit the performance of one or more of the first operation, the second operation, the third operation, and the fourth operation unless the response to the notification is favorable, i.e., the pilot has authorized the display of the second image. In some embodiments, the PM 170 could perform at least one of the second operation, the third operation, and the fourth operation repetitively with or without repetitively receiving further input data. Then, the method of flowchart 300 ends.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation. It will be appreciated to those skilled in the art that the preceding examples and embodiments are exemplary and not limited to the scope of the present invention.

It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for incorporating Virtual Network Computing ("VNC") into an aircraft cockpit display system ("CDS"), comprising:
    a non-aircraft system comprising a remote VNC client and a remote display unit located outside of the aircraft and accessed by at least one person having a role in or responsible for the safe operation of the aircraft; and
    an aircraft CDS, comprising:
        a cockpit display unit;
        an ARINC 661 user application;
        a VNC server; and
        a processing module including at least one processor coupled to a non-transitory processor-readable medium storing processor-executable code and configured to perform a plurality of operations, including:
            establishing a pixel data set representative of an image being viewed on the cockpit display unit by cockpit flight personnel, wherein
                the pixel data set is established based on at least one ARINC 661 widget, and
                the at least one ARINC 661 widget is based upon corresponding ARINC 661 widget data of the ARINC 661 user application;
            receiving, from the remote VNC client of the non-aircraft system, input data representative of a request to display the image on the remote display unit of the non-aircraft system;
            sending, in response to receiving the input data, a request for remote frame buffer ("RFB") data representative of the image from the processing module to the VNC server;
            receiving, from the VNC server, a response comprising the requested RFB data; and
            sending, via an aircraft datalink communications system controlled by the cockpit flight personnel through a cockpit unit configured to control aircraft datalink communications, the RFB data to the remote VNC client of the non-aircraft system, whereby
                the image is presented on the remote display unit, thereby
                    visually conveying to the at least one person the same image viewed on the cockpit display unit by the cockpit flight personnel.

2. The system of claim 1, wherein
the plurality of operations includes:
    activating a layer to which at least one ARINC 661 widget representative of a notification of the request to display the image on a remote display unit of a non-aircraft system is assigned;
    sending a notice of layer activation to a user application owning the layer;
    receiving ARINC 661 widget parameters and a request to activate the visibility of the layer in response to the notice of layer activation; and
    receiving input data via a pilot input device representative of a favorable or unfavorable selection of one of the at least one ARINC 661 widget.

3. The system of claim 2, wherein
the plurality of operations includes:
    inhibiting the performance of at least one of the sending of the request for RFB data to the VNC server, the receiving of the requested RFB data from the VNC server, and the sending the RFB data to the remote VNC client unless the selection of one ARINC 661 widget is favorable.

4. A method for incorporating Virtual Network Computing ("VNC") into an aircraft cockpit display system ("CDS"), comprising:
    performing, by a processing module of the CDS including at least one processor coupled to a non-transitory processor-readable medium storing processor-executable code, a plurality of operations including:
        establishing a pixel data set representative of an image being viewed on a cockpit display unit of the CDS by cockpit flight personnel, wherein
            the pixel data set is established based on at least one ARINC 661 widget, and
            the at least one ARINC 661 widget is based upon corresponding ARINC 661 widget data of an ARINC 661 user application;
        receiving, from a remote VNC client of a non-aircraft system comprising the remote VNC client and a remote display unit located outside of the aircraft and accessed by at least one person having a role in or responsible for the safe operation of the aircraft, input data representative of a request to display the image on the remote display unit;
        sending, in response to receiving the input data, a request for remote frame buffer ("RFB") data representative of the image from the processing module to a VNC server of the CDS;
        receiving, from the VNC server, a response comprising the requested RFB data; and
        sending, via an aircraft datalink communications system controlled by the cockpit flight personnel through a cockpit unit configured to control aircraft datalink communications, the RFB data to the remote VNC client of the non-aircraft system, whereby
            the image is presented on the remote display unit, thereby
                visually conveying to the at least one person the same image viewed on the cockpit display unit by the cockpit flight personnel.

5. The method of claim 4, wherein
the plurality of operations includes:
    activating a layer to which at least one ARINC 661 widget representative of a notification of the request to display the image on a remote display unit of a non-aircraft system is assigned;
    sending a notice of layer activation to a user application owning the layer;
    receiving ARINC 661 widget parameters and a request to activate the visibility of the layer in response to the notice of layer activation; and
    receiving input data via a pilot input device representative of a favorable or unfavorable selection of one of the at least one ARINC 661 widget.

6. The method of claim 5, wherein
the plurality of operations includes:
    inhibiting the performance of at least one of the sending of the request for RFB data to the VNC server, the receiving of the requested RFB data from the VNC server, and the sending the RFB data to the remote VNC client unless the selection of one ARINC 661 widget is favorable.

7. A method for incorporating Virtual Network Computing ("VNC") into an aircraft cockpit display system ("CDS"), comprising:
performing, by a processing module of the CDS including at least one processor coupled to a non-transitory processor-readable medium storing processor-executable code, a plurality of operations including:
establishing a pixel data set representative of a first image;
receiving input data representative of a request to present at least a portion of a second image being presented on a remote display unit of a non-aircraft system located outside of the aircraft and accessed by at least one person having a role in or responsible for the safe operation of the aircraft;
generating first ARINC 661 protocol data representative of the request to display the second image;
sending the first ARINC 661 protocol data to a window manager user application comprising a VNC client and configured with both ARINC 661 data exchange protocols and VNC data exchange protocols, such that
the VNC client of the window manager user application:
generates first VNC protocol data representative of a request for remote frame buffer ("RFB") data of the second image,
sends the first VNC protocol data to a VNC server of the non-aircraft system, and
receives second VNC protocol data from the VNC server, where
the second VNC protocol data is responsive to the request for RFB data of the second image and is comprised of RFB data;
receiving second ARINC 661 protocol data from the window manager user application, where
the second ARINC 661 protocol data is generated by the window manager user application in response receiving to the second VNC protocol data; and
incorporating the second ARINC 661 data into the pixel data set, such that
an image comprised of at least a VNC image widget corresponding to the second image is presented on a cockpit display unit of the CDS.

8. The method of claim 7, wherein
the plurality of operations includes:
activating a layer to which at least one ARINC 661 widget representative of a notification of the request to present at least a portion of a second image is assigned;
sending a notice of layer activation to a user application owning the layer;
receiving ARINC 661 widget parameters and a request to activate the visibility of the layer in response to the notice of layer activation; and
receiving input data via a pilot input device representative of a favorable or unfavorable selection of one of the at least one ARINC 661 widget.

9. The method of claim 8, wherein
the plurality of operations includes:
inhibiting the performance of at least one of the generating first ARINC 661 protocol data representative of the request to display the second image, the sending the first ARINC 661 protocol data to a window manager user application, the receiving second ARINC 661 protocol data from the window manager user application, and incorporating the second ARINC 661 data into the pixel data set unless the selection of the one ARINC 661 widget is favorable.

* * * * *